US010129349B2

(12) United States Patent
Papakostas et al.

(10) Patent No.: US 10,129,349 B2
(45) Date of Patent: Nov. 13, 2018

(54) SYSTEMS, METHODS, AND APPARATUS TO PROCESS BACKGROUND REQUESTS WHILE MONITORING NETWORK MEDIA

(71) Applicant: The Nielsen Company (US), LLC, New York, NY (US)

(72) Inventors: Achilleas Papakostas, Dallas, TX (US); Susan Cimino, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 254 days.

(21) Appl. No.: 15/253,350

(22) Filed: Aug. 31, 2016

(65) Prior Publication Data
US 2018/0063264 A1 Mar. 1, 2018

(51) Int. Cl.
G06F 15/173 (2006.01)
H04L 29/08 (2006.01)
H04L 12/26 (2006.01)

(52) U.S. Cl.
CPC ............ *H04L 67/22* (2013.01); *H04L 43/028* (2013.01); *H04L 43/106* (2013.01); *H04L 67/28* (2013.01); *H04L 67/32* (2013.01)

(58) Field of Classification Search
CPC ......... H04L 67/22; H04L 67/28; H04L 67/32; H04L 43/028; H04L 43/106
USPC ....................................................... 709/224
See application file for complete search history.

(56) References Cited

U.S. PATENT DOCUMENTS

| 2014/0273923 | A1* | 9/2014 | Papakostas | ........... H04W 24/08 455/405 |
| 2014/0280896 | A1* | 9/2014 | Papakostas | ............. H04W 4/50 709/224 |
| 2015/0127819 | A1* | 5/2015 | Cimino | ............... H04L 43/0876 709/224 |

OTHER PUBLICATIONS

Apple, "iOS-9," retrieved on Aug. 30, 2016, [http://www.apple.com/ios/], 5 pages.
Apple, "Apple Developer," retrieved on Aug. 30, 2016, [http://developer.apple.com/devcenter.ios/index.action], 1 page.

* cited by examiner

*Primary Examiner* — Wing F Chan
*Assistant Examiner* — Joseph R Maniwang
(74) *Attorney, Agent, or Firm* — Hanley, Flight & Zimmerman, LLC

(57) ABSTRACT

Methods, apparatus, systems, and articles of manufacture to monitor mobile Internet usage are disclosed. An example method includes accessing a log of requests from a proxy. The log of requests is a mixture of foreground requests and background requests. Each request has a timestamp and belongs to a respective application. The respective applications of the requests are identified. A burst of consecutive requests is identified in the log of requests. The requests in the burst are differentiated between the foreground requests and the background requests based on the timestamps of the requests. The respective applications of the foreground requests are credited with a presentation duration.

34 Claims, 23 Drawing Sheets

| | DEVICE IDENTIFIER | PANELIST IDENTIFIER | TIMESTAMP | HTTP REQUEST | APPLICATION IDENTIFIER | DEFAULT PRESENTATION TIME TAGGER |
|---|---|---|---|---|---|---|
| 450 | Apple® Iphone® | 50000 | 6:00:00 | GET http://app.espn.com/home.htmlHTTP/1.1<br>Host: proxy.monitoringentity.com/50000<br>User-Agent: SportCenter | ESPN | |
| 460 | Apple® Iphone® | 50000 | 6:01:23 | GET http://app.espn.com/home.htmlHTTP/1.1<br>Host: proxy.monitoringentity.com/50000<br>User-Agent: SportCenter | ESPN | |
| 470 | Apple® Iphone® | 50000 | 6:04:43 | GET http://mail.company.com/HTTP/1.1<br>Host: proxy.monitoringentity.com/50000<br>User-Agent: iPhone® Mail | Mail | |
| 480 | Apple® Iphone® | 50000 | 6:15:39 | GET http://app.espn.com/home.htmlHTTP/1.1<br>Host: proxy.monitoringentity.com/50000<br>User-Agent: SportCenter | ESPN | |
| 490 | Apple® Iphone® | 50000 | 6:17:42 | GET http://www.weather.com/HTTP/1.1<br>Host: proxy.monitoringentity.com/50000<br>User-Agent: Apple® Safari® | Safari® | |
| 492 | Apple® Iphone® | 50000 | 2:03:57 | GET http://app.facebook.com/home.htmlHTTP/1.1<br>Host: proxy.monitoringentity.com/50000<br>User-Agent: Facebook® | Facebook | ✓ |

FIG. 4

SYSTEMS, METHODS, AND APPARATUS TO PROCESS BACKGROUND REQUESTS WHILE MONITORING NETWORK MEDIA

FIELD OF THE DISCLOSURE

This disclosure relates generally to media monitoring, and, more particularly, to methods and apparatus to process background requests while monitoring network media.

BACKGROUND

In recent years, methods of accessing online media (e.g. media available via the Internet or another network) have evolved. For example, online media was formerly primarily accessed via computer systems such as desktop and laptop computers. Recently, client devices such as smartphones, tablets, over-the-top media devices, and other devices that allow users to request and view online media have grown in popularity.

BRIEF DESCRIPTION OF THE DRAWINGS

FIG. 4 is an example data table of hypertext transport protocol (HTTP) requests stored in the example data store by the example proxy of the measurement system FIG. 1.

The figures are not to scale. Wherever possible, the same reference numbers will be used throughout the drawing(s) and accompanying written description to refer to the same or like parts.

DETAILED DESCRIPTION

Figure 1:
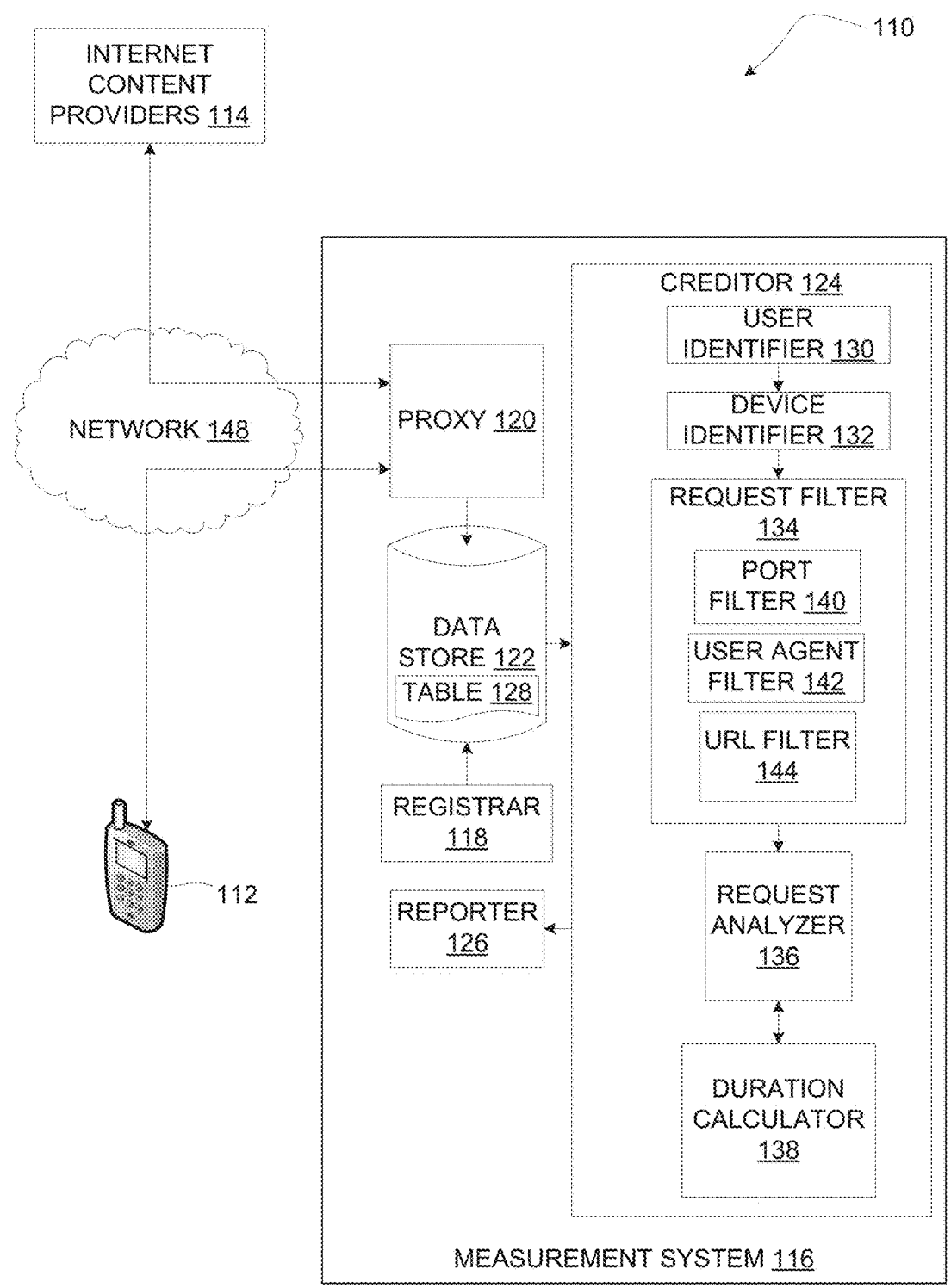
FIG. 1 is a block diagram of an example environment in which a measurement system constructed in accordance with the teachings of this disclosure operates to monitor activity in a network such as the Internet.

Audience measurement companies desire to gain knowledge on how users interact with their client devices (e.g., handheld mobile devices, smartphones, laptop computers, tablets, etc.). For example, monitoring companies want to monitor Internet traffic to and/or from the client devices to, among other things, monitor exposure to advertisements, determine advertisement effectiveness, determine user behavior, identify purchasing behavior associated with various demographics, credit application usage, etc. Some known systems have utilized a proxy server to monitor Internet content being transmitted to and from the monitored device.

Proxy servers relay requests for media (e.g., images, video, webpages, etc.) from a requesting device to a server and, in turn, relay a response from the server to the requesting device. In some examples, a request is associated with a particular application and has respective timestamps of when the request was sent by the requesting device. In some examples, client devices can be configured to route requests for media to (and/or through) a proxy server. Client devices commonly include multiple communication options such as, for example, a Wi-Fi radio, a cellular radio, etc. In some examples, the proxy settings of the communication options of the client device are configured separately. For example, a proxy auto configuration (PAC) file may be used to configure a Wi-Fi radio to utilize a first proxy server while a profile may be used to configure a cellular radio to utilize a second proxy server. Example systems, methods, and apparatus for configuring a client device to interact with a proxy are disclosed in U.S. patent application Ser. Nos. 14/928,610, 13/840,594, 13/840,543, each of which is hereby incorporated by reference in their entirety.

In some examples, requests received at the proxy server are attributable to application usage by a client device user and may be referred to as foreground requests. In other examples, requests received at the proxy server are automatically generated requests by client devices that are generated without input from a client device user. However, foreground and background requests may be mixed together, following one another closely in time, and may not be respectively designated as such (e.g., the request may not include a designation as either foreground or background). Thus, when crediting application usage, these background requests may be false positives of application usage by a client device user and may produce a distorted monitoring result.

Example systems, methods, and apparatus disclosed herein credit media presentations of applications associated with hypertext transfer protocol (HTTP) messages received at a proxy server. In some examples, application traffic (e.g., traffic from an application such as, for example, Facebook and/or a browser such as, for example, Apple® Safari®) is analyzed to determine whether a request is a background request or a foreground request to credit applications with page views and/or presentation durations based on the foreground requests (e.g., to avoid crediting background requests). In some such examples, timestamps and application information of the request under analysis and of requests preceding and following the request under analysis are logged. In some such examples, a set of rules is applied to the timestamps and the application information to determine whether the request under analysis is a background request or a foreground request (e.g., when the considered request occurs as compared to when the requests neighboring the considered request occur). In some such examples, requests determined to be foreground requests are tagged for crediting. Additionally and alternatively, in some examples, requests determined to be background requests are discarded from crediting. Some applications utilize protocols other than HTTP such as, for example, HTTP Secure (HTTPS), Real-Time Transport Protocol (RIP), etc. Accordingly, while the examples disclosed herein are described with reference to the HTTP protocol, any other past, present, and/or future protocol and/or format of communication may additionally or alternatively be used.

FIG. 1 is a block diagram of an example environment 110 constructed in accordance with the teachings of this disclosure monitors Internet activity. The example environment 110 may include an example client device 112, example Internet content providers 114, and an example measurement system 116. The example measurement system 116 may include an example registrar 118, an example proxy 120, an example data store 122, an example creditor 124, and an example reporter 126. The example data store 122 may store an example table 128. The example creditor 124 may include an example user identifier 130, an example device identifier 132, an example request filter 134, an example request analyzer 136, and an example duration calculator 138. The example request filter 134 includes an example port filter 140, an example user agent filter 142, and an example universal resource locator (URL) filter 144.

As shown in the example of FIG. 1, Internet traffic to and/or from the example client device 112 and the Internet content provider(s) 114 passes through the example proxy 120 of the example measurement system 116 via a network 148. The example measurement system 116 may thus monitor the Internet traffic between the example client device 112 and the Internet content provider(s) 114.

The network 148 of the illustrated example of FIG. 1 is a public network (e.g., the Internet). However, a private network may instead be employed for the network 148 or a portion of the network 148. For example, a network internal to an organization and/or company may be monitored to determine how members of the organization and/or employees of the company utilize client devices. In the illustrated example, the network 148 is an Internet Protocol (IP) version 4 (IPv4) based network. However, any other networking technology may additionally or alternatively be implemented. For example, the network 148 may implement the IP version 6 (IPv6) protocol.

The example client device 112 of FIG. 1 is a handheld mobile device. While, in the illustrated example, the example client device 112 is a mobile device, the example client device 112 may be any other type of computing device. For example, the example client device 112 may be a phone (e.g., an Apple® iPhone®), a laptop computer, a desktop computer, a personal digital assistant (PDA), a netbook, a tablet computer (e.g., an Apple® iPad™), a smart television, etc. The example client device 112 may be implemented with any operating system, and may be implemented with any type of hardware and/or form factor. In the illustrated example, the example client device 112 communicates via a wireless interface. However, the example client device 112 may utilize any other type(s) of communication interface, for example, an Ethernet connection, a Bluetooth connection, a Wi-Fi connection, a cellular connection (e.g., a Time Division Multiple Access (TDMA) connection, Code Division Multiple Access (CDMA) connection, Worldwide Interoperability for Microwave Access (WiMAX) connection, Long Term Evolution (LTE) connection, etc.), etc.

In the illustrated example, the example client device 112 is associated with a panelist participating in a monitoring service. Although the example system of FIG. 1 is a panelist-based system, non-panelist and/or hybrid panelist systems may alternatively be employed. In the panelist system of the illustrated example, demographic information is obtained from the user of the example client device 112 when the user joins and/or registers for the panel. The demographic information may be obtained from the user via a telephone interview, by having the user complete an online survey, etc. Additionally or alternatively, panelists may be contacted and/or enlisted using any desired methodology (e.g., random selection, statistical selection, phone solicitations, Internet advertisements, surveys, advertisements in shopping malls, etc.).

In the illustrated example, the example client device 112 is owned, leased, or otherwise belongs to a first panelist. The monitoring entity of the illustrated example does not provide the example client device 112 to the first panelist. In other systems, panelists may be provided with client devices to participate in a panel. While in the illustrated example, the example client device 112 is associated with a single panelist, the example client device 112 may alternatively be associated with more than one panelist. For example, a family may have a single client device (e.g., a tablet computer) that may be shared amongst multiple users. The sharing of a client device is less common when the client device is a cellular phone than when the client device is a less personal device such as a portable computer (e.g., a laptop computer).

The example Internet content provider(s) 114 of the example of FIG. 1 supply content to clients via the Internet can be implemented by any number and/or type of Internet provider. For example, the Internet content provider(s) 114 may comprise a web server hosting webpages formatted as Hypertext Markup Language (HTML) content. Alternatively, the Internet content provider(s) 114 may be an application server(s) providing application content (e.g., media, audio, video, etc.) to applications accessing Internet content. The application content may be formatted as HTML, XML, or may use any other protocol or port to return content to the requester. In some examples, the application data is implemented in a protocol specifically targeted for an application (e.g., a weather application) requesting Internet content.

In the illustrated example, the example measurement system 116 is shown as multiple computing systems. However, the measurement system 116 may alternatively be comprised of a single computing system. Further, additional structures may be implemented to carry out one or more portions of the functionalities implemented by the example registrar 118, the example proxy 120, the example data store 122, the example creditor 124, the example reporter 126, and/or other structures associated with one or more additional and/or alternative functions.

The example registrar 118 of FIG. 1 is implemented by a logic circuit such as a processor executing computer readable instructions, but it could additionally or alternatively be implemented by an Application Specific Integrated Circuit (ASIC(s)), a Programmable Device (PLD(s)), a Field Programmable Logic Device (FPLD(s)), an analog circuit, and/or digital circuitry. In the example of FIG. 1, the example registrar 118 receives registration information from the panelist and stores a record identifying the panelist and/or their respective client device 112. In the illustrated example, the record identifying the panelist is a port number assigned to the panelist (e.g., the port assigned to the panelist may be 50,000 and the record identifying the panelist may be 50,000). In the illustrated example, the received registration information includes demographic information. However, any other information may additionally or alternatively be collected. The registration information may include, for example, information identifying the model of the example client device 112 associated with the panelist, a mailing address associated with the panelist, an email address associated with the panelist, a phone number associated with the example client device 112, a unique identifier of the panelist and/or client device 112 (e.g., a social security number of the panelist, a phone number of the example client device 112, a zip code of the panelist, and/or any combination or derivation of any information related to the panelist and/or client device 112), the age of the panelist, the gender of the panelist, the race of the panelist, the marital status of the panelist, the income of the panelist and/or the household of the panelist, the employment status of the panelist, where the panelist typically intend to use their device, how long the panelist has owned their device, the education level of the panelist and/or any other information related to the panelist and/or the example client device 112.

In the illustrated example, the registration data is received by the example registrar 118 via an electronic interface (e.g., by a panelist entering data into a form at a website or answering survey questions at a website). However, the example registrar 118 may receive the registration data via any other means. For example, the registrar may receive the registration data via a personal interview (by telephone or in person), a telephone interface, direct mailing, purchased lists, etc. While the example registrar 118 of the illustrated example is an electronic system, the example registrar 118 may alternatively be implemented manually by a person or group of people collecting and entering the registration data into the example data store 122.

Upon receiving the registration data, the example registrar 118 of the illustrated example creates a record associating the panelist and device identifier information with the collected demographic information. The example registrar 118 may also assign a unique alphanumeric identifier to the panelist or device. The identifier may be based on, for example, a serial number of the example client device 112. The record is stored in the example data store 122. In the illustrated example, the example registrar 118 also assigns a unique port number to the panelist and/or the example client device 112 and stores the port number in the record (or in association with the record for that panelist and/or client device). As noted above, in addition to assigning and storing the port number, the registrar may assign and store additional identifiers. For example, the registrar may assign and store an identifier of the client device and/or the panelist. The panelist or client device identifier(s) ray be the same as the port number, or they may be different from the port number.

While in the illustrated example port numbers are used to identify the panelist and/or client device 112, any other way of identifying the panelist and/or client device may additionally or alternatively be used. For example, a username and/or password may be used to identify the panelist and/or client device 112.

In the illustrated example, the example proxy 120 acts as an intermediary for the example client device 112, and, thus, is the client of the Internet content provider(s) 114. Internet content is often supplied over port 80, as most Internet content is in the form of HTTP data. However, any other port may be used to supply Internet content. For example, file transfer protocol (FTP) data may be transmitted over port 21; HTTP over Secure Socket Layer (SSL) may be transmitted over port 443, etc.

The example proxy 120 of the illustrated example of FIG. 1 is implemented by a logic circuit such as a processor executing computer readable instructions, but it could additionally or alternatively be implemented by an ASIC, a PLD, an FPLD, an analog circuit, and/or digital circuitry. The example proxy 120 of the illustrated example receives requests from the example client device 112, The requests of the example client device 112 are received by the example proxy 120 based on configuration information (e.g., a server address, a port number, a username, a password, etc.) provided to the panelist and/or client device 112. The configuration information causes the example client device 112 to transmit all subsequent requests through the example proxy 120.

Upon receiving a request from the example client device 112, the example proxy 120 retrieves the requested Internet content from the Internet content provider(s) 114 (or from a local cache if, for example, the content has previously been requested and stored). In order to identify the panelist associated with the request, communication to and/or from each specific panelist occurs over the uniquely assigned (e.g., dedicated) port. Thus, each panelist is assigned a unique port and no other panelist communicates via that port. In some examples, each panelist/device pair is assigned a unique port number to facilitate differentiation between usage of a first device (e.g., a phone) by a panelist and usage of a second device (e.g., an iPad) by the same panelist. While the communication between a client device 112 and the example proxy 120 occurs over a single port, communication between the example proxy 120 and the Internet content provider(s) 114 may be implemented over any port. Typically, the port used by the proxy to communicate with Internet content provider(s) 114 is limited to hypertext transfer protocol (HTTP) data that occurs over port 80. After retrieving the requested Internet content from the Internet content provider(s) 114, in the illustrated example the content is relayed to the requesting client device 112 via the port assigned to the client device. Additionally or alternatively, the content may be relayed to the requesting client device 112 via a port other than the assigned port (e.g., port 80).

The example proxy 120 of the illustrated example stores the requests for Internet content and/or portion(s) of such requests originating from the example client device 112 in the example data store 122 in association with the port numbers over which the request was received. Example data collected by the example proxy 120 includes a username (e.g., proxy access credentials), an IP Address of the client device 112, a proxy port number for a request, the timestamp (e.g., a timestamp in a format such as: 2010-06-14 16:04:38-0400), a request method including a full requested URL and/or a query string, a status code of a response to the request, a size of a response to the request (e.g., a size of the payload, excluding headers), a User Agent, an X-DSID (e.g., a user id for iTunes or AppStore on a iPhone), an X-Apple-Client-Application field value (e.g., "Software" for AppStore, "WiFi-Music" for iTunes), a referrer, a content type of a response to the request, a total size of a response to the request (e.g., a total size of the payload and HTTP headers), and/or time taken to serve the request (e.g., in microseconds). In storing the requests, the example proxy 120 may additionally store other identifiers such as, for example, the identifier of the example client device 112, and/or an identifier of the panelist. Additionally or alternatively, the example proxy 120 may store a portion of the Internet content in the example data store 122. For example, the example proxy 120 may store the body of a webpage transmitted to the example client device 112. In another example, the example proxy 120 may store an identifier of an advertisement appearing on the webpage transmitted to the client. This is particularly useful in situations where advertisements are rotated at websites. Additionally or alternatively, the example proxy 120 may store characteristics of the response, such as, for example the HTTP header, a status code of the HTTP header, a content type of the HTTP header, etc.

The example data store 122 of the illustrated example of FIG. 1 may be any device for storing data such as, for example, flash memory, magnetic media, optical media, etc. Furthermore, the data stored in the example data store 122 may be in any data format such as, for example, binary data, comma delimited data, tab delimited data, structured query language (SQL) structures, etc. While in the illustrated example the example data store 122 is illustrated as a single database, the example data store 122 may be implemented by multiple databases. The example data store 122 receives and stores identifiers associating a panelist with the example client device 112 from the example registrar 118. Additionally, the example data store 122 receives and stores monitoring data from the example proxy 120. The monitoring data is associated with the corresponding panelist and/or client device via the port number used for the corresponding monitored Internet traffic. The example data store 122 may also be capable of storing data that is not identifiers and/or measurement data. For example, software and/or firmware for any component of the measurement system 116 may be stored in the example data store 122. Additionally, the example data store 122 may store demographic data as collected by the example registrar 118.

The example creditor 124 of the illustrated example of FIG. 1 credits application and/or browser usage to the panelist and/or client device based on the requests received by the example proxy 120. The example user identifier 130 of the illustrated example of FIG. 1 is implemented by a logic circuit such as a processor executing computer readable instructions, but it could additionally or alternatively be implemented by an ASIC, a PLD, an FPLD, an analog circuit, and/or digital circuitry. The example user identifier 130 inspects HTTP requests (and/or records including HTTP requests) received by the example proxy 120 to determine which user (e.g., panelist) transmitted the request. In the illustrated example, the example user identifier 130 identifies the panelist based on a port number via which the HTTP request is received. As shown in the example table 128 of FIG. 1, each panelist and device combination is associated with a unique port number. Accordingly, the panelist and device may be identified by the example user identifier 130 based on the port number. However, any other approach to identifying a panelist may additionally or alternatively be used. For example, panelists may be identified based on user identifying information included in the received HTTP request (e.g., a username, a password, a cookie, etc.)

The example device identifier 132 of the illustrated example of FIG. 1 is implemented by a logic circuit such as a processor executing computer readable instructions, but it could additionally or alternatively be implemented by an ASIC, a PLD, an FPLD, an analog circuit, and/or digital circuitry. The example device identifier 132 identifies a device that transmitted an HTTP request by performing a lookup of registration data and/or device data received from the panelist that is associated with the port number of the received request. However, any other method of identifying the device associated with the received request may additionally or alternatively be used. For example, the example device identifier 132 may inspect the data in the user agent field of the received request to identify a device from which it was transmitted. In some examples, a user agent field of the received request contains information about the operating system version and/or a hardware version of the device transmitting a request. In some examples, identifiers present in the user agent field (e.g., version numbers) may be used to look up a device model in a lookup table. In some examples, the example device identifier 132 identifies capabilities and/or features of the client device based on the lookup. For example, the example device identifier 132 may identify that the client device includes, for example, a cellular radio, a sixteen gigabyte memory device, etc.

The example request filter 134 of the illustrated example of FIG. 1 is implemented by a logic circuit such as a processor executing computer readable instructions, but it could additionally or alternatively be implemented by an ASIC, a PLD, an FPLD, an analog circuit, and/or digital circuitry. The example request filter 134 filters requests received by the example proxy 120 and stored in the example data store 122 based on one or more filters. In the illustrated example, the port filter 140 filters requests based on a port number of the received request, the user agent filter 142 filters requests based on a user agent of the received request, and the URL filter 144 filters requests based on a URL of the received request. The example request filter 134 may additionally filter requests based on, for example, a content type of the received request, an HTTP status message of the received request, an HTTP status code of a message returned to the example proxy 120 by the Internet content provider(s) 114, a parameter of an HTTP response received by the example proxy 120 (e.g., a response to a request transmitted to the Internet content provider(s) 114 on behalf of the example client device 112), etc. In examples disclosed herein, the example request filter 134 eliminates requests that are known to be not related to crediting. Requests that are not related to crediting may be referred to as "background" requests, while requests that are related to crediting may be called "foreground" requests. It should be understood and appreciated that the example proxy 120 may receive a mixture of foreground and background requests. For example, the example request filter 134 may remove requests that contain invalid information, data errors (e.g., messages including an HTTP status code indicating that there was an error in serving the response), duplicate records, etc. The example request analyzer 136 of the illustrated example of FIG. 1 is implemented by a c circuit such as a processor executing computer readable instructions, but it could also or otherwise be implemented by an ASIC, a PLD, an FPLD, an analog circuit, and/or digital circuitry. The example request analyzer 136 receives filtered requests from the request filter 134 (e.g., the filtered requests may be stored in the example data store 122). In examples disclosed herein, the example request analyzer 136 analyzes the respective applications and timestamps of the filtered requests with respect to one or more rules to identify and remove background requests that were not already removed by the example request filter 134 and to identify and tag certain requests as foreground requests to receive a default presentation duration, as will be described in greater detail below and in conjunction with FIG. 2. Examples of background requests that may be removed by the example request analyzer 136 include requests that are valid, but generated by automated processes (e.g., not client device 112 user-initiated) and requests that have no designated user agent, URL, content type, or other identifier. For example, the request analyzer 136 removes certain requests that pass through the example request filter 134 as valid foreground requests, but are, in fact, background requests (e.g., requests of certain applications having the ability to refresh automatically on some client device operating systems). The example request analyzer 136 may analyze these valid but uncreditworthy requests supplied by the example request filter 134 to find and remove these remaining background requests. Examples of certain requests that may be tagged by the request analyzer 136 include requests that are last in a burst of requests, as will be described below in conjunction with FIGS. 2, 10, and 10A-C. The example request analyzer 136 creates a log of the filtered and analyzed requests that is submitted to the example duration calculator 138.

The example duration calculator 138 of the illustrated example of FIG. 1 is implemented by a logic circuit such as a processor executing computer readable instructions, but it could additionally or alternatively be implemented by an ASIC, a PLD, an FPLD, an analog circuit, and/or digital circuitry. The example duration calculator 138 receives the log of filtered and analyzed requests. The example duration calculator 138 identifies elapsed time durations between untagged requests in the filtered and analyzed request log that are associated with a particular application. Further, the example duration calculator 138 compiles a duration of usage for the particular application based on the number of tagged foreground requests associated with the particular application and the cumulative elapsed time durations of the particular application.

The example reporter 126 of the illustrated example of FIG. 1 is implemented by a logic circuit such as a processor executing computer readable instructions, but it could additionally or alternatively be implemented by an ASIC, a PLD, an FPLD, an analog circuit, and/or digital circuitry. The example reporter 126 generates reports indicative of application usage metrics based on one or more different types of client devices (e.g., personal computers, portable devices, mobile phones, tablets, etc.). For example, the example reporter 126 compiles application usage metrics based on application crediting performed by the example duration calculator 138. A report is then generated to indicate application usage statistics. In some examples, the application usage measurements provide ratings information for different applications.

Additionally or alternatively, popularities of different applications across different device types may be reported. Such different types of applications may be, for example, news applications, media applications (e.g., a streaming media application, an Internet radio application, etc.), games, streaming games, email applications, productivity application (e.g., note taking applications, dictation applications, etc. etc. Such comparisons may be made across any type(s) and/or numbers of devices including, for example, cell phones, smart phones, dedicated portable multimedia playback devices, iPod® devices, tablet computing devices (e.g., an iPad®), Internet enabled televisions, stationary computers, portable computers, Internet radios, etc. Any other type(s) and/or number of applications and/or devices may be analyzed. The report may also associate the application usage metrics with demographic segments (e.g., age groups, genders, ethnicities, etc.) corresponding to the user(s) of the client device(s). Additionally or alternatively, the report may associate the application usage metrics with metric indicators of the popularity of the application and/or similar applications across one or more user characteristics selected from one or more demographic segment(s), one or more age group(s), one or more gender(s), and/or any other user characteristic(s).

Figure 2:
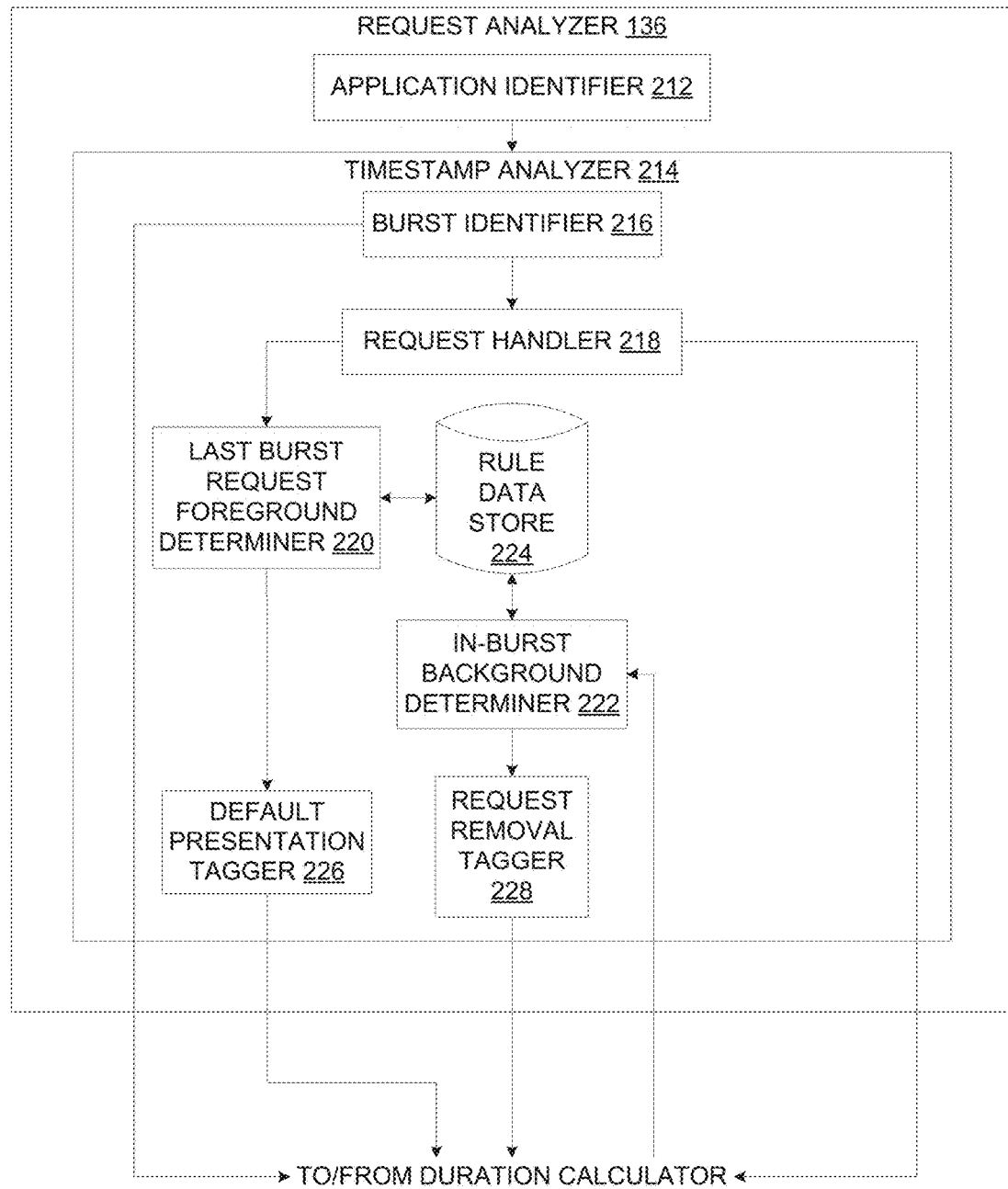
FIG. 2 is a more detailed block diagram of an example implementation of a request analyzer of the example creditor of the example measurement system of FIG. 1.

FIG. 2 is a block diagram of an example implementation of the request analyzer 136. In the illustrated example of FIG. 2, the example request analyzer 136 includes an example application identifier 212 and an example timestamp analyzer 214.

The example application identifier 212 is implemented by a logic circuit such as a processor executing computer readable instructions, but it could additionally or alternatively be implemented by an ASIC, a PLD, an FPLD, an analog circuit, and/or digital circuitry. The example application identifier 212 identifies an application associated with the received request. In the illustrated example, the example application identifier 212 identifies the application based on one or more of the user agent and/or the URL of the request. In some examples, the user agent may be generic and the URL may not identify a particular application. That is, the application of the received request may be difficult to identify. In such an example, the example application identifier 212 identifies the application associated with the received request based on other requests and/or records that came from the same panelist/device and are within a threshold period of time of the difficult-to-identify received request.

In the illustrated example, the example timestamp analyzer 214 is implemented by a logic circuit such as a processor executing computer readable instructions, but it could additionally or alternatively be implemented by an ASIC, a PLD, an FPLD, an analog circuit, and/or digital circuitry. The example timestamp analyzer 214 includes an example burst identifier 216, an example request handler 218, an example last burst request foreground determiner 220, an example in-burst background determiner 222, an example rule data store 224, an example default presentation time tagger 226, and an example request removal tagger 228. The example timestamp analyzer 214 receives application-identified requests from the example application identifier 212. In some examples, the timestamp analyzer 214 analyzes the timestamps of filtered requests to determine whether the requests are background requests or foreground requests, as will be described below. In some examples, the timestamp analyzer 214 discards background requests, as will be further explained below. In some examples, the timestamp analyzer identifies and tags certain filtered requests as foreground requests to receive the default presentation duration, to be described in greater detail below.

The example burst identifier 216 of the example timestamp analyzer 214 analyzes the timestamps of the application-identified request to find a burst of requests. In some examples, the burst identifier 216 determines a burst of requests when timestamps of two consecutive requests indicate that the consecutive requests are within a threshold time difference. For example, the threshold time difference may be five seconds. It should be understood, however, that closely-spaced-consecutive requests may be associated with other thresholds (e.g., 1 second, 10 seconds, 20 seconds, etc.). It also should be understood that a burst may include any number of consecutive closely-spaced requests. When the example burst identifier 216 identifies a burst of requests, the example burst identifier 216 notes that the requests in the identified burst belong to a burst. The example burst identifier 216 compiles a list of the burst-forming consecutive closely spaced requests (e.g., only requests that are consecutively closely-spaced with respect to one another are included in the burst). Thus, a burst identified by the example burst identifier 216 via the compiled consecutive closely-spaced requests has a first burst request and a last burst request. It should therefore be understood that, for example, the request immediately preceding the first burst request is not closely spaced to the first burst request and, for example, the request immediately following the last burst request is not closely spaced to the last burst request. Additional examples of requests that are included in a burst are described below in conjunction with FIGS. 10A-10C. Further, the example burst identifier 216 sends the identified burst of application-identified requests to the example request handler 218. Additionally, the example burst identifier 216 sends the application-identified requests that occur outside of a burst to the duration calculator 138.

The example request handler 218 of the example timestamp analyzer 214 receives the burst from the example burst identifier 216. The example request handler 218 analyzes the application-identified requests in the burst to determine the last burst request. Additionally, the example request handler 218 separates the last burst request from other requests included in the burst, referred to as in-burst requests. The example request handler 218 sends the determined last burst request to the example last burst request foreground determiner 220. The example request handler 218 sends the in-burst requests to the example duration calculator 138.

The example last burst foreground determiner 220 receives the last request of the burst ("last burst request") from the example request handler 218. The example last burst foreground determiner 220 retrieves processing rules from the rule data store 224. Further, the last burst request foreground determiner 220 determines whether the last burst request is a foreground request or a background request by applying the processing rules to the last burst request and the requests preceding and following the last burst request (e.g., the four requests preceding the last burst request and the two requests following the last burst request). Moreover, in some examples, where the example last burst foreground determiner 220 determines that the last burst request is a foreground request, the example last burst foreground determiner 220 sends the foreground-determined last burst request to the default presentation tagger 226. However, in some examples, where the example last burst foreground determiner 220 determines that the last burst request is a background request, the example last burst foreground determiner 220 discards the background-determined last burst request. Additional operations to analyze the requests of the burst preceding the last burst request ("in-burst requests") are explained in further detail below.

In some examples, the example rules stored in the rule data store 224 are related to time thresholds between a last burst request, a request of the same application as the last burst request, and requests of different applications (e.g., a timeout period, an intermediate period, a brief period, a closely-spaced period, etc.), as will be described below. In some examples, the example rules are related to the number of requests that occur in a given time period, as will be more fully explained below.

Rule 1, below, is an example rule to be applied by the example last burst request foreground determiner 220 to determine if the last burst request is a foreground request (e.g., when Rule 1 evaluates to true).

Example Rule 1: If a request immediately following a last burst request occurs after at least a threshold timeout period from the last burst request, then the last burst request is a foreground request.

It should be understood, that the threshold timeout period of the example Rule 1 may be any length of time (e.g., 30 seconds, 15 minutes, etc.). Thus, for example, when the example last burst request foreground determiner 220 observes no other request traffic within the threshold timeout period following the last burst request, the last burst request is a foreground request. Examples of the last burst request foreground determiner 220 applying example Rule 1 to requests will be described in greater detail below in conjunction with FIGS. 9A-9B.

However, in some examples where the example Rule 1 returns a false value, the example last burst request foreground determiner 220 performs additional analysis by applying an example Rule 2, below, to the last burst request and the requests preceding and following the last burst request. In some examples, the last burst request foreground determiner 220 may determine that the last burst request is a foreground request if the example Rule 2 returns a true value.

Example Rule 2: If two application sessions each having durations less than a threshold brief period precede the last burst request, the next request associated with the same application as the last burst request occurs after the threshold timeout period elapses after the timestamp of the last burst request, and the next request associated with an application different than the application of the last burst request following the last burst request occurs after a threshold intermediate period elapses from the timestamp of the last burst request, but before the threshold timeout period elapses after the timestamp of the last burst request, then the last burst request is a foreground request.

As used herein, an application session is a collection of request(s) associated with a like application (e.g., requests of different applications do not form an application session). As used herein, an application session may include any number of requests associated with the same application (e.g., any number greater than zero). In some examples, an application session may have a singular (initial) request. In some examples, an application session may include initial and final requests with multiple requests between the initial and final requests. It should additionally be understood that the threshold brief period may be of any length. In some examples, the threshold brief period may be 10 seconds. The threshold intermediate period may be of any length. In some examples, the threshold intermediate period may be 16 seconds. Thus, for example, where the example last burst request foreground determiner 220 observes: two application sessions that occur before the last burst request and each last less than the threshold brief period, a request associated with a different application than the last burst request that occurs between the threshold intermediate period after the last burst request but before the threshold timeout period, and a request associated with the same application as the last burst request that occurs after the threshold timeout period from the last burst request, the last burst request is a foreground request. Examples the example last burst request foreground determiner 220 applying example Rule 2 to requests will be described in greater detail below in conjunction with FIGS. 10A-10C.

The example default presentation tagger 226 receives requests determined to be foreground requests from the example last burst request foreground determiner 220. Further, the example default presentation tagger 226 tags the foreground-determined requests as foreground requests. The example default presentation tagger 226 sends the tagged foreground requests to the duration calculator 138 which credits the respective applications of the tagged foreground requests with, for example, a default presentation duration per tagged foreground request. The default presentation duration y be any length of time, for example, a value in the range of 1 to 60 seconds. In some examples, the default presentation duration may be 15 seconds. Additionally, the example default presentation tagger 226 sends the tagged foreground-determined requests to the example duration calculator 138.

In some examples, the in-burst background determiner 222 analyzes the in-burst requests (e.g., requests of the burst preceding the last burst request) to determine whether the in-burst requests are background requests. In some examples, after the duration calculator 138 compiles durations of usage of applications as described above, the example in-burst background determiner 222 receives the requests from the duration calculator 138 to remove background requests from the durations of usage (e.g., post-crediting analysis to subtract uncreditworthy background requests from the compiled durations). The example in-burst background determiner 222 retrieves example rules from the rule data store 224. Further, the example in-burst request background determiner 222 determines whether each request is a background request by applying the rules to the requests. Moreover, in some examples, where the example in-burst background determiner 222 determines that the request under examination is a background request, the example in-burst background determiner 222 sends the background-determined in-burst request to the request removal tagger 228. In some examples, the duration calculator 138 then respectively subtracts usage duration credit from applications based on the tagged requests and the application sessions defined by the tagged requests.

In some examples, the in-burst background determiner 222 may evaluate example Rule 3 to determine if a request is a background request if Rule 3 evaluates to true).

Example Rule 3: If the examined request is included in an application session that is shorter than the threshold brief period, there are two or fewer requests included in the application session of the examined request, the application session of the examined request is consecutive with a second application session that is shorter than the threshold brief period, and the second application includes two or fewer requests, then all of requests included in the application session of the examined request and the second application session are background requests.

Thus, for example, where the example in-burst background determiner 222 observes that the examined request is included an application session that has a duration less than the threshold brief period and has no more than one request in addition to the examined request and that a second application session that has a duration less than the threshold brief period and has no more two request is consecutive with the application session of the examined request, all the requests included in the examined request application session and the second application session are background requests. Examples of the application of example Rule 3 by the in-burst background determiner 222 will be described in greater detail below in conjunction with FIG. 12A.

The example request removal tagger 228 receives requests determined to be background requests from the in-burst background determiner 222. Further, the example request removal tagger 228 tags the background-determined requests to be subtracted from the application usages compiled by the example duration calculator 138. Additionally, the example request removal tagger 228 sends the tagged background-determined requests to the example duration calculator 138.

Figure 3:
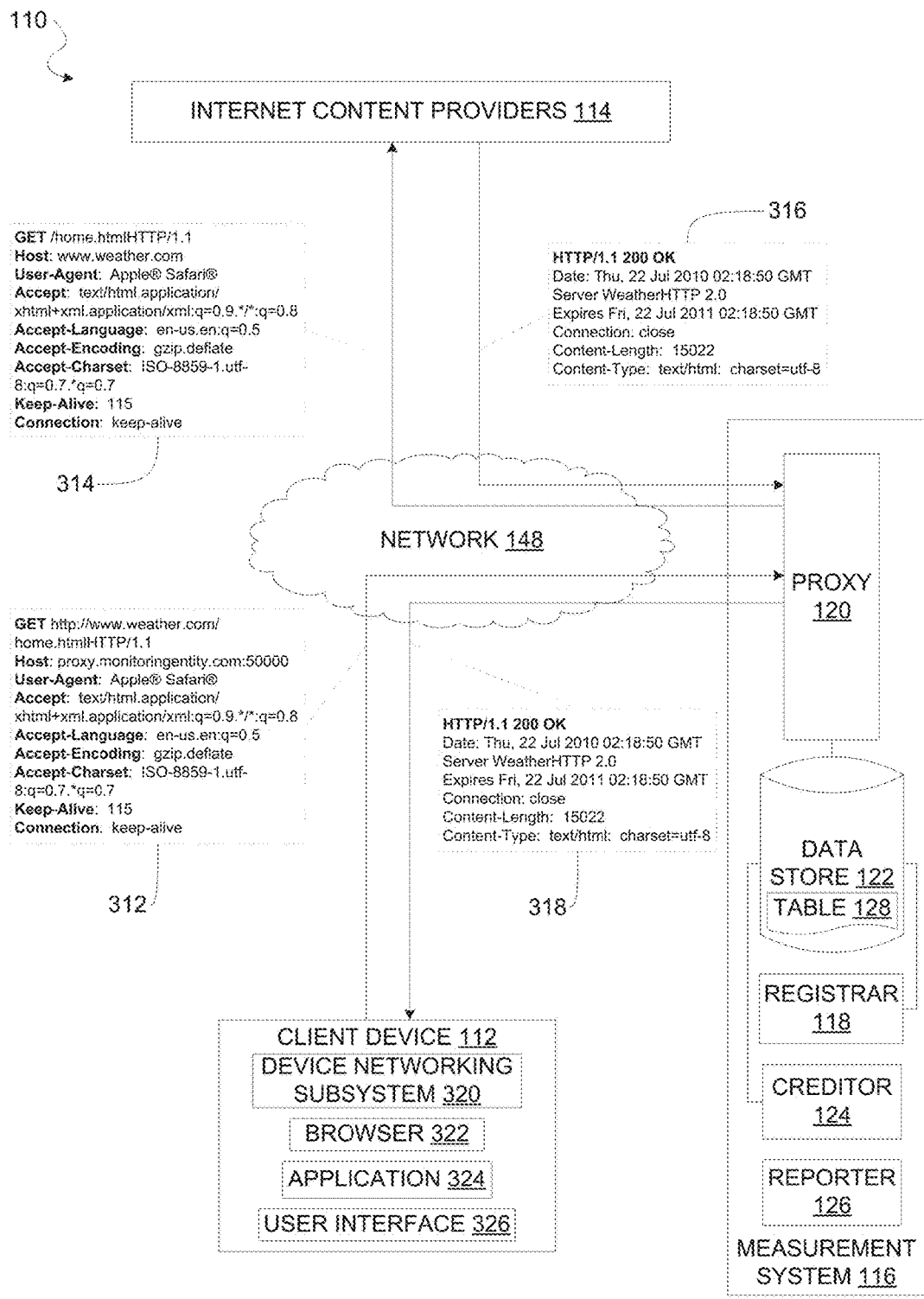
FIG. 3 is a block diagram illustrating an example flow of a request and a response in the example environment of FIG. 1.

FIG. 3 is a block diagram illustrating an example request and response flow through the example system 110 of FIG. 1. The block diagram of FIG. 3 illustrates communication between the example client device 112, the example Internet content provider(s) 114, and the example proxy 120 and the example data store 122 of the example measurement system 116 via the example network 148. The block diagram includes the example measurement system 116, the Internet content provider(s) 114, the example client device 112, and the network 148. The block diagram additionally includes a first request 312, a second request 314, a first response 316, and a second response 318. Further, it should be understood that the requests and responses of the illustrated example of FIG. 3 are represented by respective HTTP request and response headers. In the illustrated example, the example client device 112 includes an example networking subsystem 320, an example browser 322, an example application 324, and an example user interface 326.

The example networking subsystem 320 of the example of FIG. 3 provides a framework for transmitting and receiving content. The example networking subsystem 320 may be implemented via an application processor, a software system that facilitates networked communication, a browser engine, a baseband processor that transmits network traffic, and/or any other system that provides a framework for transmitting and receiving content. As used in this context, "content" passes material of interest to a user such as entertainment, news, etc. as well as information that may not be of interest to the user such as advertisements. In the illustrated example, the example networking subsystem 320 is implemented by the networking libraries provided in the Apple® iPhone® operating system. However, any other libraries, systems, or programs may additionally or alternatively be used. The example browser 322 and example application 324 of the example of FIG. 3 are applications that are executed by a processor of the example client device 112. The example browser 322 requests HTTP Internet content from the example Internet content provider(s) 114, and renders the HTTP content for display. Additionally or alternatively, the application 324 may request and render HTTPS Internet content. In some examples, the browser 322 is implemented by Apple® Safari®. However, any other application may alternatively be used. For example, Pocket Internet Explorer may be used. In sonic examples, the HTTP Internet content is HTML content. However, the content may be presented in any format that may be rendered by the example browser 322.

The example application 324 of the example of FIG. 3 may be any application on the client device that requests and/or accesses Internet content. For example, the example application 324 may be a weather application accessing Internet content provided by www.weather.com. The example Internet content provider(s) 114 providing content for www.weather.com may respond to content requests with HTML data. However, any other type of data may be contained in the content request. For example, the Internet tent provider(s) 114 providing content for www.weather.com may provide an XML file containing a condensed weather forecast. Additionally or alternatively, the example application 324 may request media such as, for example, photos, video, audio, etc. Typically, applications accessing Internet content like the example application 324 are limited to a small amount of information to be displayed. For example, the weather application may not be able to display sports news. Although the example browser 322 or the example application 324 may initiate requests for content, in some devices, such as the Apple® iPhone®, requests are formatted and transmitted by the example device networking subsystem 320 based on system wide settings that control routing and/or addressing of such requests (e.g., to a specific port of an example proxy 120).

The user interface 326 of the illustrated example provides a display to the user and receives input from the user. The user interface 326 may comprise hardware, a graphics library, and/or a graphics driver for displaying content to the panelist, and may comprise hardware, an input library, and/or an input driver for receiving input from the panelist. Either or both the browser 322 and/or the application 324 may utilize the user interface 326 to display content and receive input.

The illustrated example of FIG. 3 shows a communication stream for a single request. The example proxy 12.0 of the illustrated examples of FIGS. 1 and 3 receives the first request 312 for Internet content from the example client device 112 over the network 148, requests the content by generating and sending the second request 314 to the corresponding Internet content provider 114 over the network 148, receives the content in the first response 316 from the Internet content provider 114 via the network 148, and relays the content to the example client device 112 by generating and sending the second response 318 via the network 148. Further, the example proxy 120, upon receiving the first request 312, may store some or all of the request in the example data store 122. In some examples, the second request 314 is addressed to the Internet content provider(s) 114 identified in the first request 312. In further examples, second request 314 in the illustrated example is transmitted over a port identified by first request 312. In some examples the example proxy 120 stores some or all of the first response 316 in the example data store 122. In further examples, the example proxy 120 forwards the content of the first response 316 as the second response 318 to the example client device 112 over the port assigned to the example client device 112.

More specifically, the first request 312 is a GET request generated by the example client device 112. In the illustrated example, the Internet content provider(s) 114 is identified by the absolute Universal Resource Locator (URL) identified in the first line of the first request 312 and the address of the example proxy 120 and uniquely assigned port are identified by the "Host" line of the first request 312. The host identified in the illustrated example is proxy.MonitoringEntity.com, and the port that the request was made on is 50,000. However, any other address identifying the example proxy 120 and any other port may alternatively be used. For example, the address identifying the example proxy 120 may be the Internet Protocol (IP) address of the example proxy 120. In the illustrated example, the absolute URL of the Internet resource is "http://www.weather.com/home.html." However, any other URL may additionally or alternatively be used.

In the illustrated example, the second request 314 is a GET request directed to "http://www.weather.com," is transmitted over port 80 as no port other than port 80 is identified in first request 312. The content being requested from "http://www.weather.com" in the illustrated example is "/home.html." The proxy generates the contents of the second request 314 by inspecting the first request 312. For example, the example proxy 120 identifies the requested content of the first request 312 as "http://www.weather.com/home.html," determines that the port to be translated to is port 80 (identified by http://), determines that the Internet content provider(s) 114 identified is "www.weather.com," and determines that the requested webpage from the Internet content provider is "/home.html." The second request 314 is transmitted over port 80 because the example proxy 120 determines that the requested content is HTTP content, and no alternative port number is specified.

In some examples, the content identified by the example first request 312 may be content that is provided on a port other than port 80. For example, the example client device 112 may seek to request content that is hosted on port 1234, rather than the default port (e.g., port 80). In that alternate example, an absolute URL of the first request 312 may identify the requested content as "http://www.weater.com:1234/home.html," to convey that the content identified by the request is provided on port 1234 (rather than the default port). Further, in such an example, the example proxy 120 generates the second request 314 that identifies port 1234 (e.g., www.weather.com:1234).

In the illustrated example of FIG. 3, the example first response 316, as identified by the first response 316, is transmitted over port 80, as the first response 316 is a response to the second request 314 made on port 80, as indicated by the second request 314. However, any other port may be used to transmit the first response 316 to the example proxy 120. The example proxy 120 may receive the first response 316 and may determine the correct port that the second response 318 should be transmitted over. In the illustrated example, the example proxy 120 determines the port that the second response 318 should be transmitted over by associating the first response 316 with the first request 312 via the second request 314. In such an example, the example proxy 120 may identify that the first request 312 originated on port 50,000 based on the first request 312, and thus, the second response 318 should be transmitted on port 50,000, as identified in the second response 318. However, any other method of determining the port to transmit the second response 318 may additionally or alternatively be used. Further, the response may be transmitted over a port other than the port assigned to the example client device 112.

FIG. 4 is a more detailed view of the example table 128 stored in the example data store 122 by the example proxy 120. The example table 128 includes a device identifier column 410, a panelist identifier column 420, a timestamp column 430, an HTTP request column 440, an application identifier column 442, and a default presentation time tagger column 444. The ellipses (" . . . ") at the bottom of FIG. 4 indicate that the table contains a truncated version of the table for purposes of illustration. Moreover, in the illustrated example of FIG. 4, the example table 128 includes data associated with a single device and a single panelist. However, in practice, the example table 128 stored in the data store 122 by the example proxy 120 will include data associated with any number of different devices and/or any number of panelists. Further, the example table 128 illustrates an example time period of approximately eight hours. However, in practice, the example table 128 stored in the data store 122 will include data associated with a longer time frame such as, for example, a day, a week, month, etc.

The example table 128 of FIG. 4 includes a first row 450, a second row 460, a third row 470, a fourth row 480, a fifth row 490, and a sixth row 492. The first example row 450 of the illustrated example of FIG. 4 includes a record that identifies that an Apple iPhone associated with the panelist 50000 transmitted an HTTP request at 6:00:00 PM. The second example row 460 of the illustrated example of FIG. 4 includes a record that identifies that the Apple iPhone associated with the same panelist 50000 transmitted an HTTP request at 6:01:23 PM. The third example row 470 of the illustrated example of FIG. 4 includes a record that identifies that the Apple iPhone associated with the same panelist 50000 transmitted an HTTP request at 6:04:43 PM.

The fourth example row 480 of the illustrated example of FIG. 4 includes a record that identifies that the Apple iPhone associated with the panelist 50000 transmitted an HTTP request at 6:15:39 PM. The fifth example row 490 of the illustrated example of FIG. 4 includes a record that indicates that the Apple iPhone associated with the same panelist 50000 transmitted an HTTP request at 6:17:42 PM. The sixth example row 492 of the illustrated example of FIG. 4 includes a record that indicates that the Apple iPhone associated the same panelist 50000 transmitted an HTIP request at 2:03:57 AM. The first, second, and fourth example rows 450, 460, 480 include user agents identifying that the requests were associated with an ESPN application. The example HTTP requests of the example third row 470 include a user agent identifying that the request was associated with an iPhone e-mail application. The example HTTP request of fifth example row 490 is associated with a Safari browser. The sixth example row 492 shows a user agent identifying that the request was associated with a Facebook application and further shows that the example HTTP request is to be credited with the default presentation time. However, the user agent(s) may associate their respective request(s) with any other application such as, for example, a Netflix application, a newsreader application, a browser application, etc.

As disclosed herein, the example table 128 represents a filtered, identified, and analyzed request log that may be processed by the example duration calculator 138 to calculate durations of application usage associated with different applications. This process of successively filtering, identifying, and analyzing requests may collectively be referred to as "smoothing" as it discards spikes of unwanted background burst last requests from the pool of records to be processed for crediting by the duration calculator. Thus, a filtered, identified, and analyzed request log such as, for example, the table 128 of FIG. 4 may be referred to as a smoothed log.

While an example manner of implementing the measurement system 116 of FIG. 1 is illustrated in FIGS. 2 and 3, one or more of the elements, processes and/or devices illustrated in FIGS. 1-3 may be combined, divided, rearranged, omitted, eliminated and/or implemented in any other way. Further, the example registrar 118, the example proxy 120, the example data store 122, the example creditor 124, the example, reporter 126, the example table 128, the example user identifier 130, the example device identifier 132, the example request filter 134, the example request analyzer 136, the example duration calculator 138, the example port filter 140, the example user agent filter 142, the example URL filter 144, the example application identifier 212, the example timestamp analyzer 214, the example burst identifier 216, the example request handler 218, the example last burst request foreground determiner 220, the example in-burst background determiner 222, the example rule data store 224, the example default presentation tagger 226, the example request removal tagger 228, the example first request 312, the example second request 314, the example first response 316, the example second response 318, the example device networking subsystem 320, the example browser 322, the example application 324, the example user interface 326 and/or, more generally, the example environment 110, the example Internet content providers 114, the example measurement system 116, and the example network 148 of FIGS. 1-3 may be implemented by hardware, software, firmware and/or any combination of hardware, software and/or firmware. Thus, for example, any of the example registrar 118, the example proxy 120, the example data store 122, the example creditor 124, the example, reporter 126, the example table 128, the example: user identifier 130, the example device identifier 132, the example request filter 134, the example request analyzer 136, the example duration calculator 138, the example port filter 140, the example user agent filter 142, the example URL filter 144, the example application identifier 212, the example timestamp analyzer 214, the example burst identifier 216, the example request handler 218, the example last burst request foreground determiner 220, the example in-burst background determiner 222, the example rule data store 224, the example default presentation tagger 226, the example request removal tagger 228, the example first request 312, the example second request 314, the example first response 316, the example second response 318, the example device networking subsystem 320, the example browser 322, the example application 324, the example user interface 326 and/or, more generally, the example environment 110, the example Internet content providers 114, the example measurement system 116, could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example registrar 118, the example proxy 120, the example data store 122, the example creditor 124, the example, reporter 126, the example table 128, the example user identifier 130, the example device identifier 132, the example request filter 134, the example request analyzer 136, the example duration calculator 138, the example port filter 140, the example user agent filter 142, the example URL filter 144, the example application identifier 212, the example timestamp analyzer 214, the example burst identifier 216, the example request handler 218, the example last burst request foreground determiner 220, the example in-burst background determiner 222, the example rule data store 224, the example default presentation tagger 226, the example request removal tagger 228, the example first request 312, the example second request 314, the example first response 316, the example second response 318, the example device networking subsystem 320, the example browser 32 the example application 324, the example user interface 326, the example environment 110, the example Internet content providers 114, and the example measurement system 116, is/are hereby expressly defined to include a tangible computer readable storage device or storage disk such as a memory, a digital versatile disk (DVD), a compact disk (CD), a Blu-ray disk, etc. storing the software and/or firmware. Further still, the example measurement system 116 of FIGS. 1-3 may include one or more elements, processes and/or devices in addition to, or instead of, those illustrated in FIGS. 1-3, and/or may include more than one of any or all of the illustrated elements, processes and devices.

A flowchart representative of example machine readable instructions for implementing the measurement system 116 of FIGS. 1-3 is shown in FIGS. 5-12. In this example, the machine readable instructions comprise a program for execution by a processor such as the processor 1312 shown in the example processor platform 1300 discussed below in connection with FIG. 13. The program may be embodied in software stored on a tangible computer readable storage medium such as a CD-ROM, a floppy disk, a hard drive, a digital versatile disk (DVD), a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowcharts illustrated in FIGS. 5-12, many other methods of implementing the example measurement system 116 may alternatively be used. For example, the order of execution of the blocks may be changed, and/or some of the blocks described may be changed, eliminated, or combined.

As mentioned above, the example processes of FIGS. 5-12 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5-12 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 5:
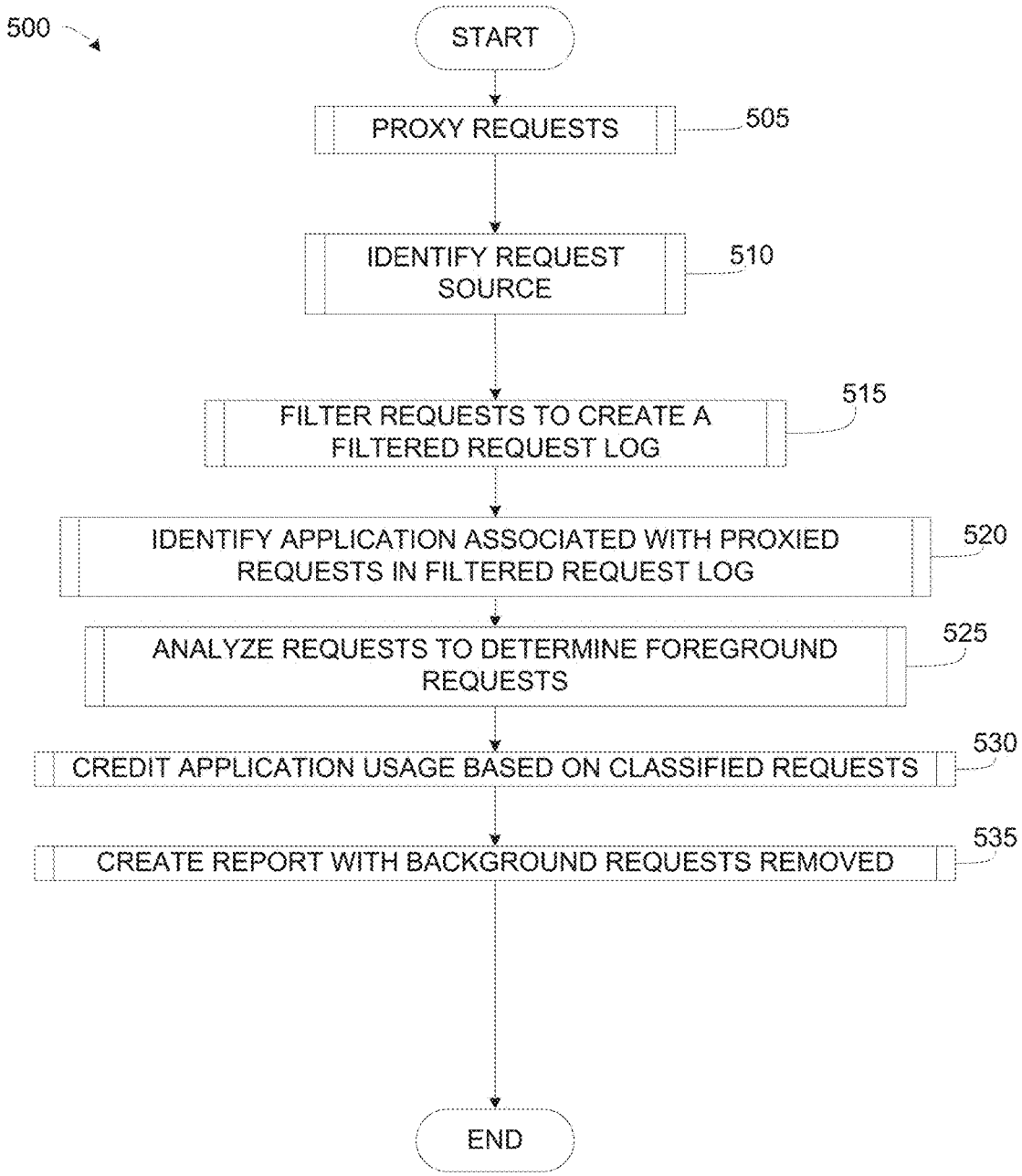
FIGS. 5-10 are flowcharts representative of example machine-readable instructions for implementing the measurement system of FIGS. 1-3.

The program 500 of FIG. 5 begins when the example proxy 120 of FIG. 1 receives a request from the example client device 1 (block 505). The example proxy 120 proxies a request to Internet content provider(s) 114, and stores a record of the request in the example data store 122. An example procedure for proxying requests and storing data in the example data store 122 is described in the illustrated example of FIG. 6. Once data is stored in the example data store 122, the example user identifier 130 and the example device identifier 132 of the illustrated example of FIG. 1 identify and store a source (e.g., a panelist and a client device) associated with the proxy requests (block 510). An example procedure for identifying and storing a source of the proxied requests is described in the illustrated example of FIG. 7.

The example request filter 134 of the illustrated example of FIG. 1 then filters the requests stored at block 505 (block 515). An example method of filtering the stored requests is described below in the illustrated example of FIG. 8. In some examples, the example request filter 134 filters based on one or more properties of an HTTP response (e.g., a response to a request made by the example client device 112 via the example proxy 120). Response headers (e.g., an HTTP response header) and/or response bodies (e.g., an HTTP response body) may be analyzed to filter the requests. For example, a content type of a response may be used to filter an associated request and a response code (e.g., an HTTP status code) may be used to filter an associated request, etc.

In some examples, the example request filter 134 filters some of the received HTTP messages (e.g., HTTP requests and/or HTTP responses) when they are received by the example proxy 120 to determine whether a record associated with the HTTP message should be stored in the example data store 122. Filtering the messages when they are received reduces the amount of data that must be stored in the example data store 122, as fewer HTTP messages may be stored when compared to storing all received HTTP messages. As an additional benefit, the amount of processing time required to post-process the stored records is reduced, as fewer records are later processed by the example request filter 134.

The example application identifier 212 of the illustrated example of FIG. 2 identifies an application that transmitted each filtered request (block 520). In examples disclosed herein, the example application identifier 212 identifies the application associated with each request based on a user agent and/or a universal resource locator (URL). However, any other identifier may additionally or alternatively be used. An example method of identifying the application associated with a request s described in the illustrated example of FIG. 9. In some examples, identifying an application that transmitted the request is performed at the time that the request is received.

The example timestamp analyzer 214 of the illustrated example of FIG. 2 analyzes the identified and filtered requests received from block 520 (block 525) to create a filtered identified analyzed request log, an example of which shown in FIG. 4. The filtered identified analyzed request log does not include last burst requests that cannot be credited to an application and/or browser. Put another way, background last burst requests are prevented from being logged into the filtered identified analyzed request log. In examples disclosed herein, the example timestamp analyzer 214 analyzes last burst requests based on rules regarding how close in time requests from the same application are to one another, how close in time requests from different applications are to one another, and how many requests there are in a given window of time. Depending on the outcome of the application of these rules, the example timestamp analyzer 214 may tag some requests to alert the example duration calculator 138 to credit the default presentation duration for each tagged record to their respective applications. Said differently, depending on the outcome of the rules imposed by the example timestamp analyzer 214, some requests may be tagged by the example timestamp analyzer 214 for the example duration calculator 138 to give those requests' applications the default presentation duration's worth of credit, per request. An example method of applying time-respective rules to filtered and identified requests is shown in the illustrated example of FIG. 10. In some examples, analyzing identified and filtered requests is performed in turn on a rolling basis as requests are received, filtered, and identified.

Based on the filtered, identified (e.g., application resolved), and sifted requests, the example duration calculator 138 credits application(s) with representative usage durations (block 530). In examples disclosed herein, the example duration calculator 138 finds a duration of usage of an application by compiling calculated time differences between requests with the product of the default presentation duration and the number of requests tagged by the example request analyzer 136 for requests that are all associated with a same application. Put another way, in examples described below, for requests that all belong to the same application, the example duration calculator 138 adds together elapsed times calculated from the requests' timestamps with the amount of default presentation duration time that may be credited to the application according to the tagged requests from the example request analyzer 136. An example method of calculating a duration of usage of an application is described in the illustrated example of FIG. 11.

Post-crediting, the timestamp analyzer 214 reanalyzes the requests to remove in-burst background requests and the example reporter 126 generates a report based on the application crediting data with the in-burst background requests removed (block 535). An example method of removing in-burst background requests is described in the illustrated example of FIG. 12. An example report is shown in FIG. 12B.

Figure 6:
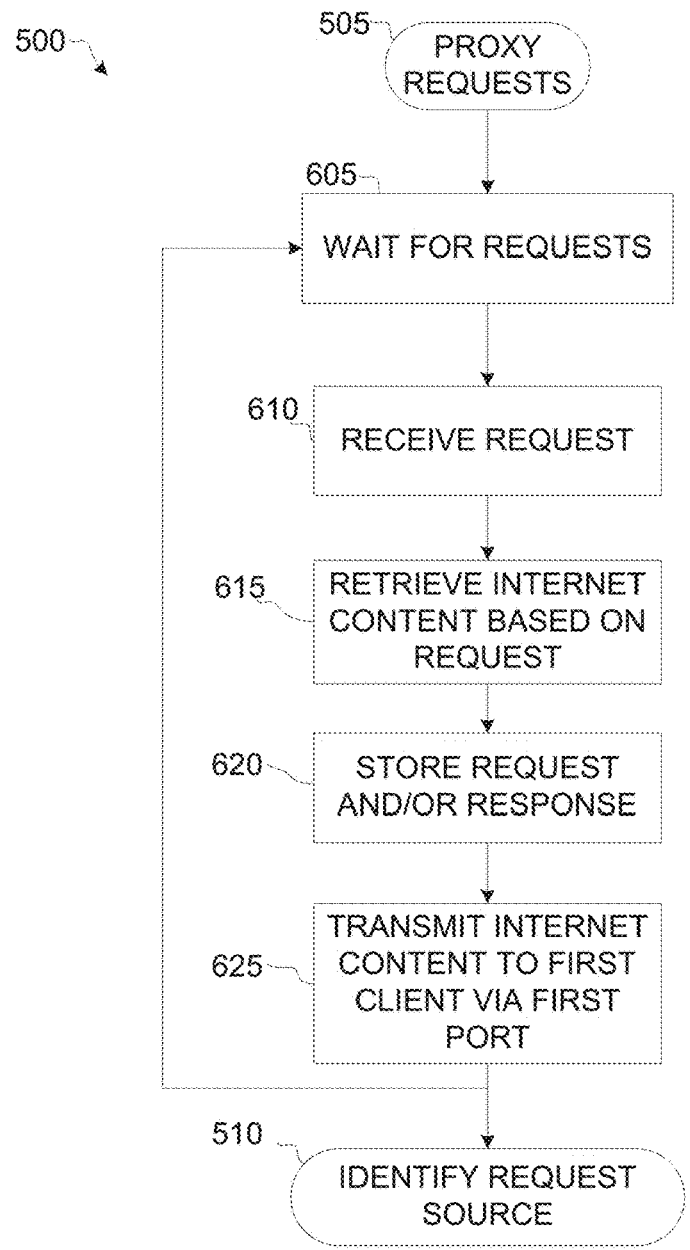

FIG. 6 is a flowchart representative of example machine-readable instructions for implementing processing at block 505 of the example program 500 of FIG. 5. In the example of FIG. 6, to proxy the requests, example proxy 120 waits for content requests (block 605). In the illustrated example, the example proxy 120 waits for content requests only on ports assigned to a client device. However, the example proxy 120 may wait for content requests on any or all ports. Additionally, the example proxy 120 may inspect the Internet Protocol (IP) address against known range(s) of IP addresses to determine if the request should be serviced. For example, the known range of IP address may include ranges of IP addresses which are assigned to a particular Internet service provider and/or carrier. This may, for example, restrict use of the example proxy 120 to client devices. If the example proxy 120 determines that the request did not originate from an IP address within the particular Internet service provider, the example proxy 120 may ignore the request. In some examples, the example proxy 120 inspects a user agent of an incoming request to determine whether the request should be serviced. For example, if the user agent is associated with a desktop application (e.g., a desktop browser, etc.), the request may be blocked.

Next, the example proxy 120 receives a content request on a port (block 610). Further, the example proxy 120 generates second request(s) based on corresponding ones of the request received at block 610 to retrieve the Internet content identified in the corresponding content requests (block 615). Additionally, the example proxy 120 stores the content requests and/or responses in the example data store 122 (block 620). In some examples, the response may include information that may be useful for crediting purposes (e.g., an HTTP content types, an HTTP status code, an HTTP response body such as contents of a webpage, etc.). In some examples, the example proxy 120 stores the body of the request. In some other examples, the example proxy 120 stores the content of the response to the request. Since each port is used only by a single client device, each client device can be uniquely identified based on the port umber of the port on which a request s received. Further, when storing the association in the example data store 122, the example proxy 120 may store one or more identifier(s) of the port, the client device, the panelist, etc. In some examples, the application that transmitted the request is identified and stored in the example data store 122 at this point, rather than during post-processing of the received request(s).

In some examples, the example proxy 120 may filter what is stored in the data store. For example, the example proxy 120 may only store content requests that request HTTP content, as requests for non-HTTP content may not be parsed properly when analyzing the information. As another example, the example proxy 120 may omit style content (e.g., cascading style sheet (CSS) documents) from being stored in the example data store 122, as style content may be of limited use when analyzing the information.

The example proxy 120 finishes servicing the request from the client device by transmitting the requested Internet content to the client device via the port on which the content request was received (block 625). Control returns to the block 605, where the example proxy 120 waits for more content requests (block 605).

Figure 7:
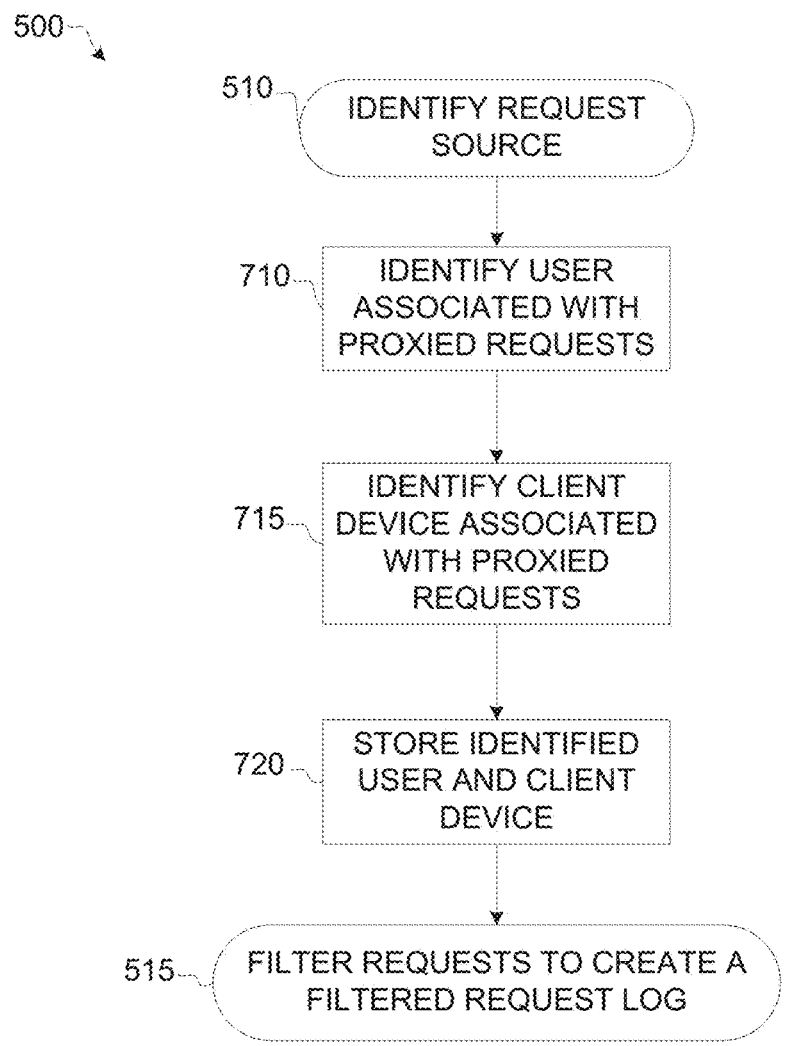

FIG. 7 is a flowchart representative of example machine-readable instructions for implementing processing at block 510 of the example program 500 of FIG. 5. In the example of FIG. 7, to identify a source of the request, the user identifier 130 identifies a user or panelist associated with the proxied requests (block 710). In the illustrated example, the example user identifier 130 identifies the panelists by performing a lookup in a panelist identifier table (e.g., the example table 128 of FIG. 1) based on, for example, a port number of the received request. In some examples, the example user identifier 130 uses information other than the port identifier (e.g., a port number of the received HTTP request). For example, the example user identifier 130 identifies a panelist based on a username and/or password associated with the proxy request.

Next, the example device identifier 132 identifies the client device 112 associated with the proxy request (block 715). In the illustrated example, the example device identifier 132 identifies the device by performing a lookup of registration data and/or device data that is associated with the port number of the received request. However, any other method of identifying the device associated with the received request may additionally or alternatively be used. For example, the example device identifier 132 may inspect the user agent of the received request to identify a device from which it was transmitted. In some examples, a user agent of the received request contains information about the operating system version and/or a hardware version of the device transmitting a request. In some examples, identifiers present in the user agent (e.g., version numbers) may be used to look up a device model in a lookup table. In some examples, the example device identifier 132 identifies capabilities and/or features of the client device based on the lookup. For example, the example device identifier 132 may identify that the client device 112 includes, for example, a cellular radio, a sixteen gigabyte memory device, etc.

Despite having received device identifying information from the panelist (e.g., a device model such as, for example, an iPhone, an iPad, etc.), in some examples, it is beneficial to understand additional information about the device such as, for example, a model number, a size of available memory (e.g., eight gigabytes, sixteen gigabytes, etc.), an operating system version identifier, etc. Such information may be difficult to receive from a panelist and/or may be inaccurate if, for example, the panelist does not remember (or know) which operating system version identifier their client device is using. In some examples, not all requests transmitted by the example client device 112 include such device identifying and/or feature identifying data (e.g., a model number, a size of available memory, etc.). However, some applications, such as "App Store" applications (e.g., apple iTunes, Google Play), transmit device and/or feature identifying data. App store applications typically transmit this information to ensure that a correct version of an application to be downloaded and/or installed on the client device is retrieved. For example, an application that operates on an iPhone may not operate correctly on an iPad; an application may require a minimum operating system version identifier. In some examples, the device identifying and/or feature identifying information may only be included when the HTTP request is transmitted by an "App Store" application of the client device. In such an example, panelists may be asked to periodically access the "App Store" application to trigger an HTTP request that conveys the device identifying information to the monitoring entity via the user agent. In some examples, the example device identifier 132 responds to such an HTTP request by updating a table associating device information with a panelist. Such information may be useful for identifying which devices and/or versions of devices are in use by panelists.

Further, the proxy 120 stores the identified user and the identified client device in the data store 122.

Figure 8:
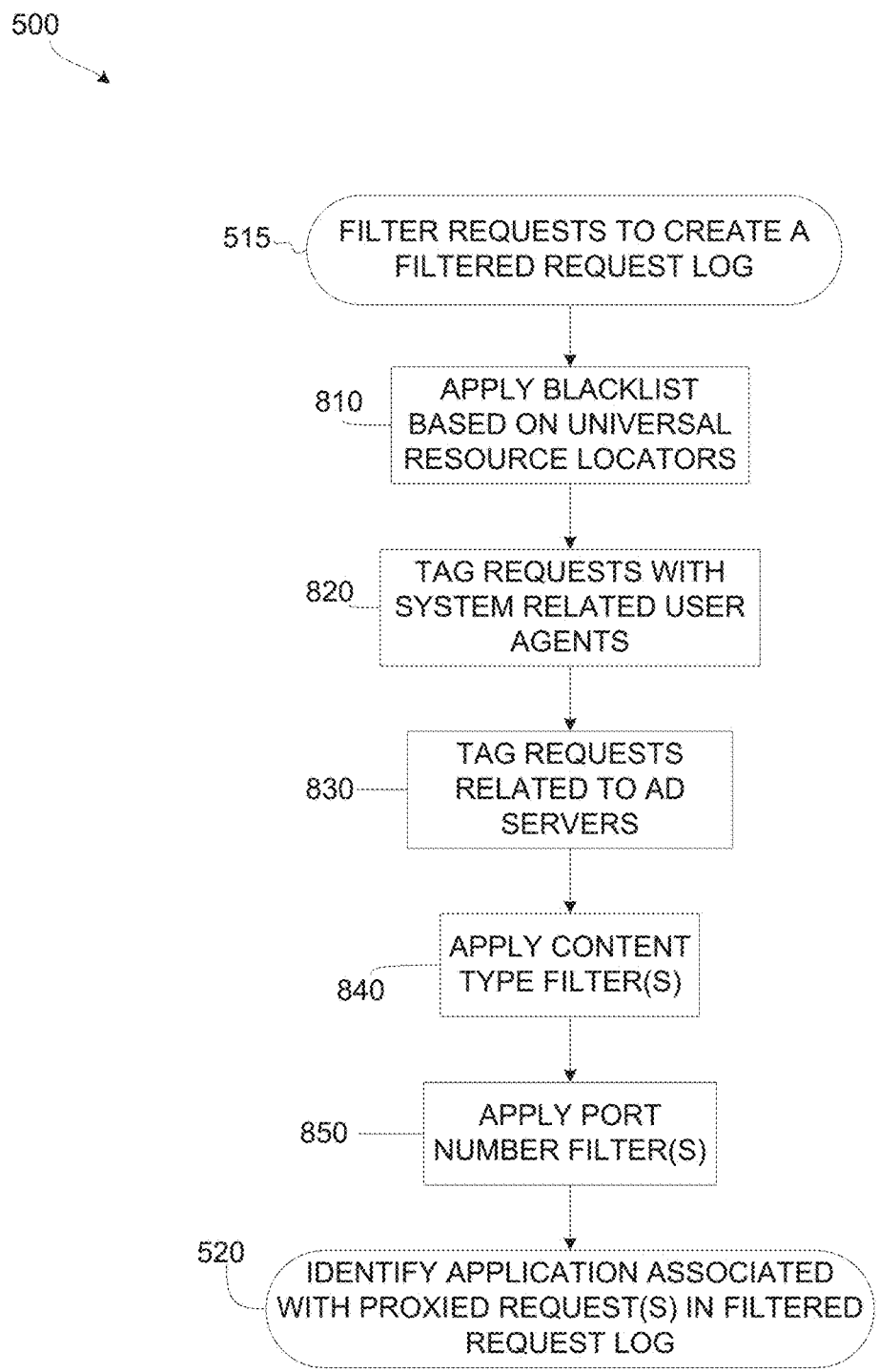

FIG. 8 is a flowchart representative of example machine-readable instructions for implementing processing at block 515 of the example program 500 of FIG. 5. In the example of FIG. 8, to filter requests to create a filtered request log, the example request filter 134 applies a blacklist based on universal resource locators (URLs) of the requests stored in the example data store 122 (block 810). Some URLs are related to background activities. Such URLs may include, for example, URLs associated with analytics, tracking, measurement robots, advertisement objects, etc. In some examples, the example request filter 134 only applies the URL filter when a particular user agent is used (e.g., a user agent associated with a browser such as, for example Safari). Applying such a two-part filter enables the example request filter 134 to remove HTTP requests that are not foreground requests, i.e., associated with actual browsing and/or user activity. In some examples, the filtering happens on the fly such that these requests are not recorded and/or are deleted almost immediately after they occur.

The example request filter 134 tags requests with user agents r to client device system functionality (block 820). Some applications such as location applications, app store applications, email applications, newsreader applications, etc. transmit requests for content automatically (e.g., without user instruction). That is, as a result of the requests with user agents related to client device system functionality, no visual indicators are shown on the client device display. For example, an e-mail application may send a request to an e-mail server to determine whether any new messages are present and/or are to be downloaded. Such a request from an e-mail application may occur periodically and/or a periodically and is not necessarily performed as a result of user interaction with the client device.

The example request filter 134 tags requests directed to advertisement servers (block 830). In the illustrated example, advertisement servers are identified based on a known list of advertising servers. The list may periodically and/or a-periodically be updated to identify newly identified advertisement and/or advertising servers. Advertising traffic primarily occurs when using a browser (e.g., to view a website that includes an advertisement). In the illustrated example, browser records (e.g., HTTP requests that can be identified as being associated with a browser such as, for example, Safari) should be tagged as related to advertisement server activity when they are directed to an advertisement server. For example, browser records may be tagged as advertisement server activity based on identification of URLs directed to application advertisement servers. In the illustrated example, these records are not ignored and, instead, are kept so that they can be included in ad server traffic reporting. However, records tagged as directed to tracking scripts, bots, and/or analytics scripts are not considered when calculating a duration of usage of an application as they do not represent user activity. Records tagged as related to advertisement server activity that identify an application being used may be used to credit applications and the duration spent using an application.

The example request filter 134 applies a content type filter to remove records having particular content types (block 840). As described above, advertisement and/or tracking requests (see Blumenau, U.S. Pat. No. 6,108,637, which is hereby incorporated by reference in its entirety) are commonly sent when applications are running. In some examples, the advertisement and/or tracking requests are the only type(s) of requests that applications transmit. For example, a game application that does not request information from a network resource as part of the gameplay functionality may include advertisements (e.g., at the top and/or bottom of the screen). Such advertisements may be requested and categorized as advertisement traffic based on, for example, a URL to which they were directed. While it may not be possible to identify applications based on the advertising traffic (because, in some examples, the advertising traffic is generic to multiple applications), knowing that the advertising traffic occurred factors into how other applications are credited because, for example, it is known that a game was played while another application was not. In some examples, the advertising traffic uses particular content types that must be included in the results for determining how long a particular application was executed.

In the illustrated example, a white list is used for filtering content types. That is, requests having a content type that is included on the white list are not filtered and/or removed from the HTTP record blogs. In an illustrated example, the whitelist of content types includes, for example, application/XHTML+XML, application/text/HTML, application/text, application/json, application/XML, application/binary, application/octet stream, text/vnd.wap.wml, application/PDF, application/MSWord, text/HTML, text/XML, etc. However, any other content type(s) may additionally and/or alternatively be used. In the illustrated example, there are some content types that are not included in the whitelist. For example, the content types text/CSS, text/x-cross-domain-policy, text/javascript, text/x-js, and text/cfg are example content types that are not included in the whitelist. While in the illustrated example a white list is used, any other approach for filtering records management alternately be used such as, for example, a blacklist.

The example request filter 134 applies a port number filter to remove records having particular port numbers (block 850). As described above, panelists are each assigned a unique port number to use when sending HTTP requests. The example request filter 134 applies a port number filter to remove records that are not associated with a panelist. In the illustrated example, the port number filter is a whitelist including port numbers that are associated with respective panelists. For example, if no panelist is associated with port 12345, IMP requests received port 12345 may be removed from the HTTP log. In some examples, the filter is implemented as a blacklist, in that HTTP requests made via ports that are not related to panelist traffic are removed. For example, the example request filter 134 may remove HTTP communications that were received via port 80. Port 80 is associated with the HTTP protocol and is not assigned to a panelist. In some examples, when the example client device 112 requests proxy configuration details (e.g., prior to when the client device is configured to transmit requests via the example proxy 120), such requests are made via port 80. Because requests for configuration information do not represent user activity they can be ignored and/or removed by the example request filter 134.

While in the illustrated example of FIG. 8 the example request filter 134 applies a number of different filters (e.g., a port filter 140, a user agent filter 142, a URL filter 144, etc.), any other number and/or types of filters may additionally or alternatively be used such as, for example, a filter based on HTTP status messages, a filter based on a HTTP method (e.g., get, post, etc.), etc.

Figure 9:
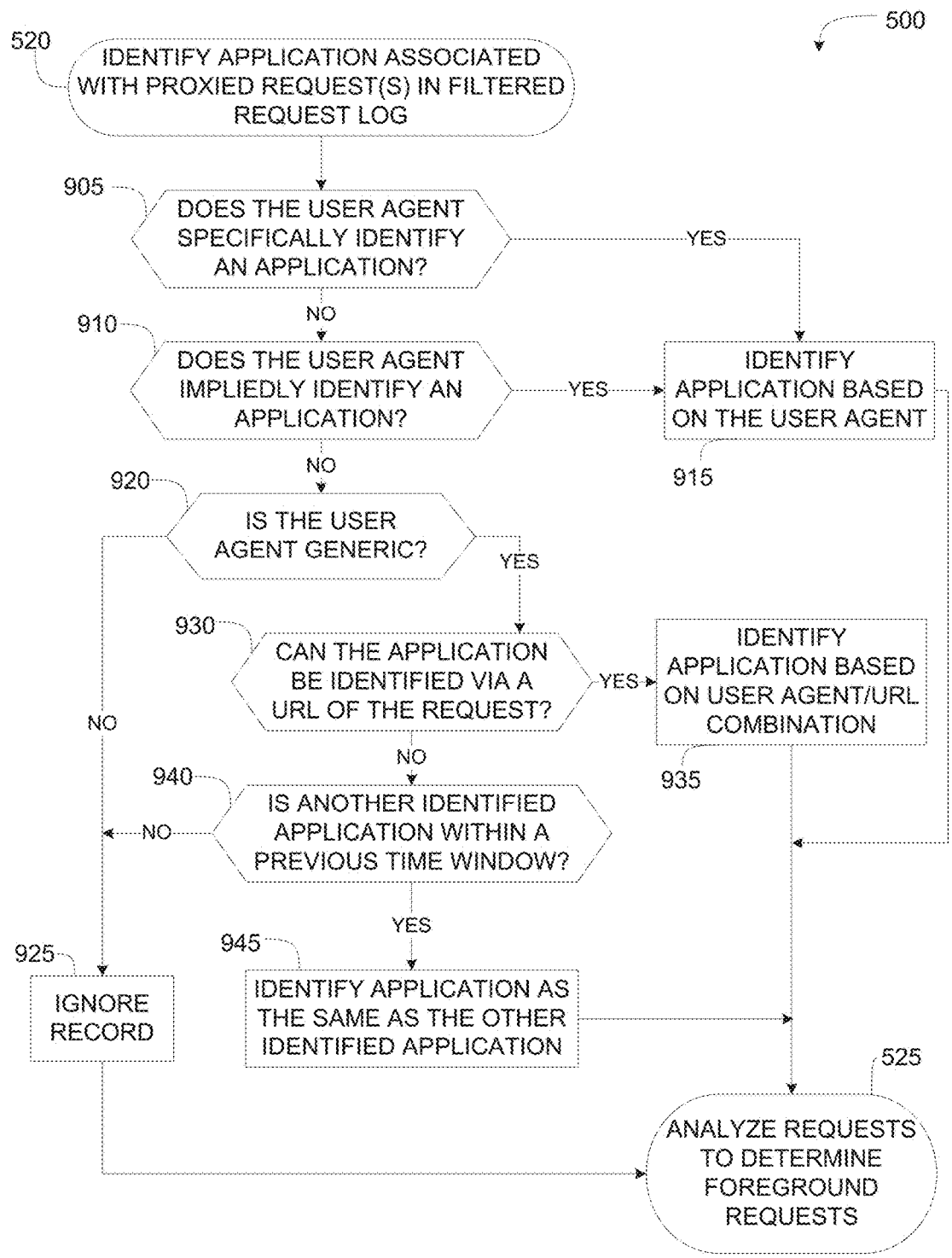

FIG. 9 is a flowchart representative of example machine-readable instructions for implementing processing at block 520 of the example program 500 of FIG. 5. In the example of FIG. 9, to identify application associated with proxied requests in the filtered request log, the example application identifier 212 determines whether the user agent of a proxied request explicitly identifies an application (block 905). In some examples, the user agent includes a name of an application that transmitted the associated HTTP request. For example, a siriusXM application may include the name siriusXM within the user agent. In the illustrated example of FIG. 4, row 490 includes an HTTP request that expressly indicates that the request came from Apple® Safari®. If the user agent explicitly identifies the application (block 905) the example application identifier 212 identifies the application based on the user agent (block 915). If the user agent does not explicitly identify the application(block 905), the example application identifier determines whether the user agent impliedly identifies the application (block 910). In some examples, the user agent does not directly include a name of an application with which it is associated. For example, an ESPN application may include a name of "SportCenter" within the user agent. That is, the user agent, while not directly identifying the name of the application, may indirectly identify the application by use of an alternate name. In the illustrated example of FIG. 4, rows 450, 460, 480 includes an HTTP request that impliedly indicates that the request came from the ESPN application. In the illustrated example, the application is identified by performing a look up of alternate names based on an alternate name table. Additionally or alternatively, the user agent may correspond to a user agent pattern that has been identified as being used by a particular application (e.g., empirically and/or as specified by an application developer). If the user agent impliedly and/or indirectly identifies an application (block 910), the example application identifier 212 identifies the application based on the user agent (block 915).

In some examples, the user agent may not include a name that directly and/or indirectly identifies the application that transmitted the associated HTTP request (blocks 905, 910). In such an example, the example application identifier 212 determines if the user agent is a generic user agent (block 920). For example, some applications use a standard application programming interface (API) and/or software development kit (SDK) (e.g., webkit) which, when used, sets a default user agent identifying the API and/or SDK. In some examples, it may be possible to identify the application based on other parameters of the HTTP request (e.g., a URL), despite the generic user agent. If the user agent of the HTTP request is not generic (block 920), and the user agent does not impliedly and/or explicitly identify the associated application (blocks 905, 910), the example application identifier 212 ignores the record associated with the HTTP request (block 925). In examples disclosed herein, when the record is ignored, a duration of presentation is not calculated for the application. However, the record is not excluded from the log as it may indicate that the user switched from one application to another.

If the user agent does not identify the application (block 910), but instead is generic (block 920), the example application identifier 212 determines whether the application can be identified via a universal resource locator of the request (block 930). An application may be known to transmit requests to a particular URL. For example, a sports application may routinely transmit request to a sports website and/or webserver. Identifying that the request is sent to the sports website and/or webserver may identify the application that transmitted the request. In the illustrated example, the application is identified by performing a lookup against a table associating URLs and/or domain names that are associated with a particular application. Accordingly, if the example application identifier 212 can identify the application based on the URL of the associated HTTP request (block 930), the example application identifier 212 identifies the application based on the user agent and universal resource locator combination (e.g., the generic user agent and the URL) (block 935).

If the application cannot be identified by URL of the request (block 930), the example application identifier 212 determines if any other identified application exists within a previous time window (block 940). In the illustrated example the example application identifier 212 uses a previous time window of fifteen minutes. However, any other time window may additionally or alternatively be used. In the illustrated example, the example application identifier 212 determines that other identified application exists by comparing the user agent of the instant request with previous requests to identify HTTP requests that are associated with the same user agent. User agents of applications do not typically change. That is, applications do not typically change their user agent unless a change to the application is also made. For example, a user agent may change when an application is upgraded from a first version (using a first user agent) to a second version (using a second user agent different from the first user agent). As a further example, the first version of the application will typically only use the first user agent. Accordingly, HTTP request that include a user agent other than the user agent of the instant record are not likely to have come from the same application. If the example application identifier 212 identifies an HTTP request with the previous time window that used a same user agent (block 940), the example application identifier 212 identifies the application of the instant HTTP request as the same application as the HTTP request in the previous time window (block 945). If no previous request is identified (block 940), the example application identifier 212 ignores the request (block 925). In examples disclosed herein, when the request is ignored (block 925), it is not included in the duration calculation described in connection with FIG. 11.

In examples disclosed in FIG. 9, the example application identifier 212 parses each filtered request in the filtered request log created by the example request filter 134. That is, the example process 500 of the illustrated example of FIG. 9 is performed for each record in the filtered request log. As an outcome of the application identification process, each record is identified as either "app resolved," "unknown," or "ignored". App resolved records represent records where an application associated with the HTTP request is identified.

In contrast, unknown and/or ignored records represent records where the application associated with the HTTP request cannot be identified.

Figure 10:
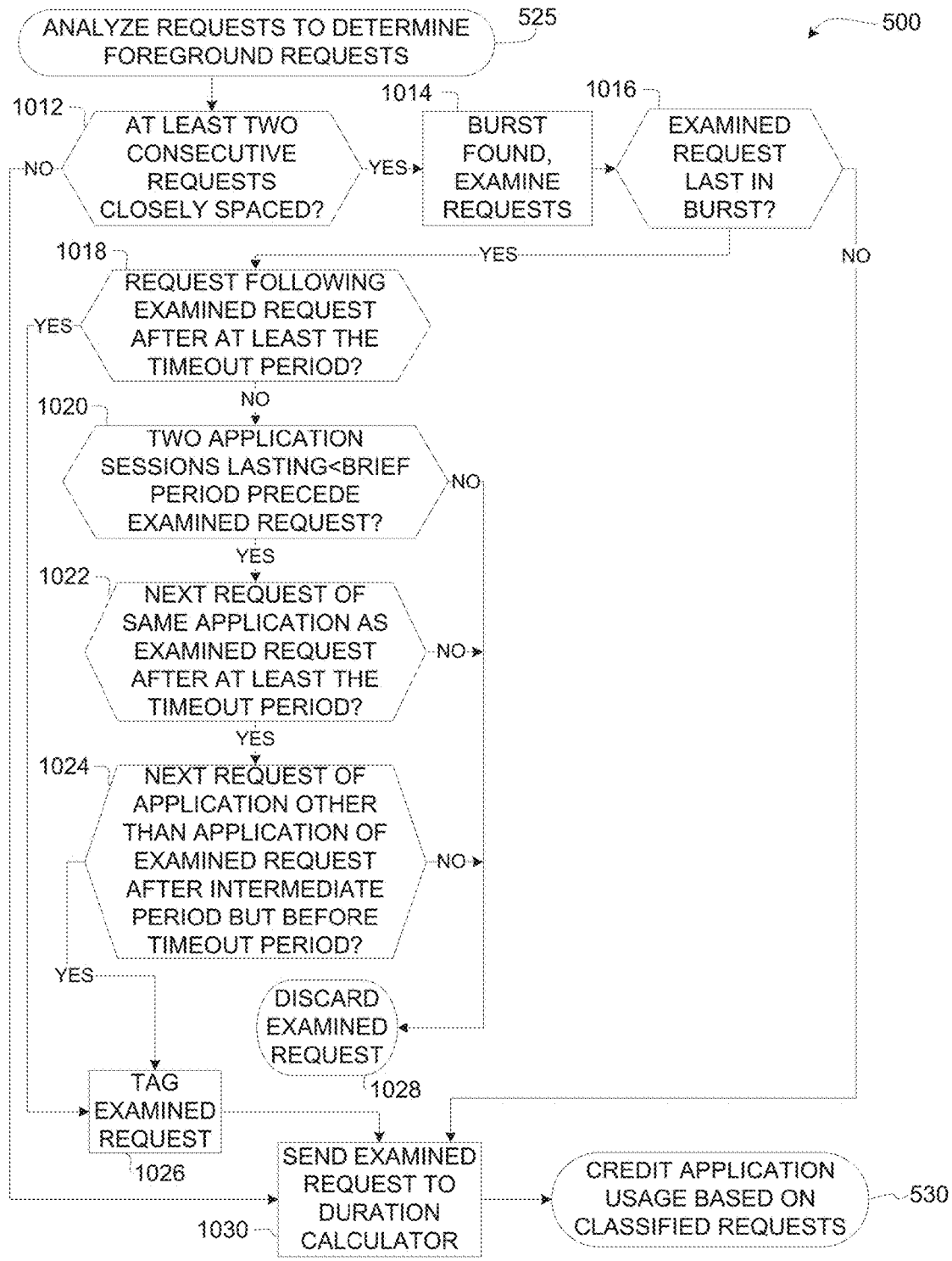
Figure 10A:
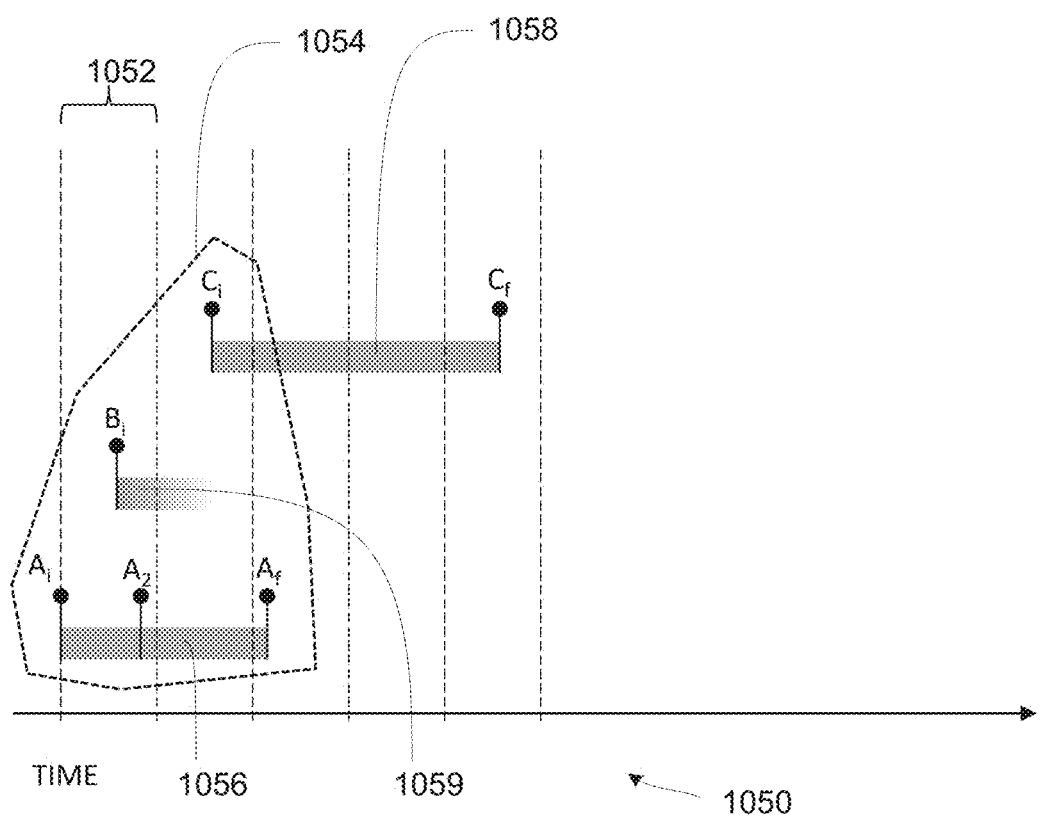
FIGS. 10A, 10B, and 10C illustrate example timelines of HTTP requests that may be analyzed by the example request analyzer of FIG. 2.
Figure 10B:
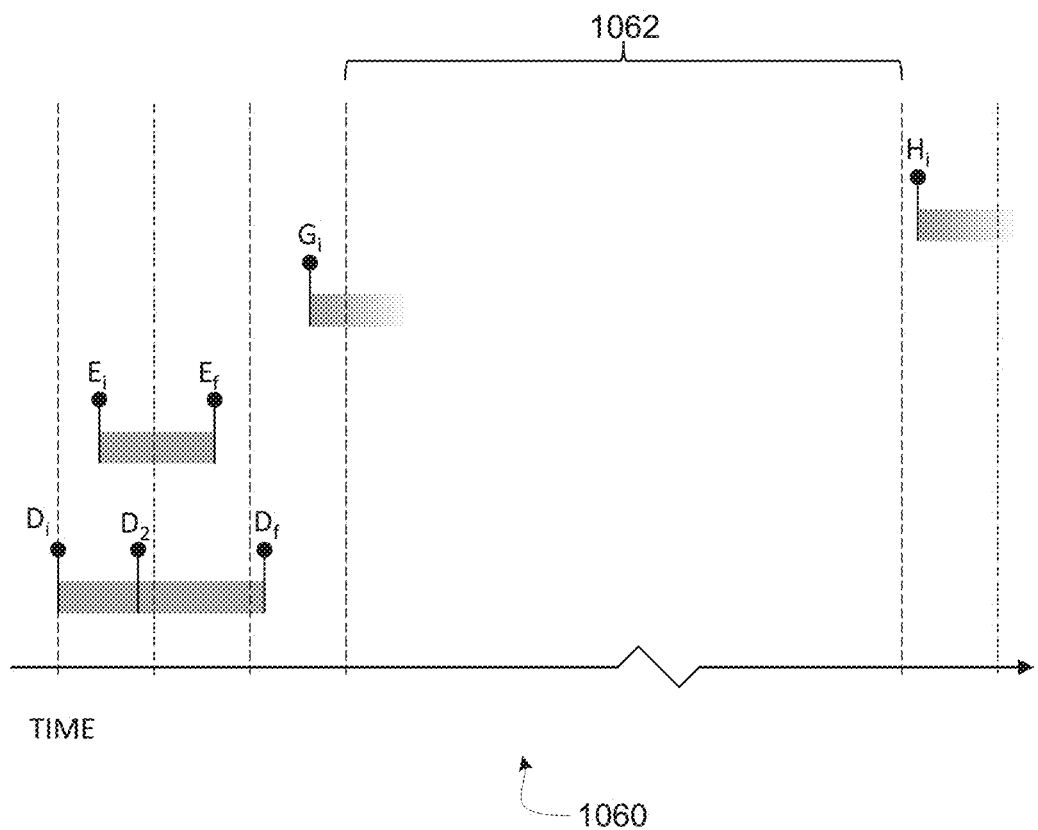
Figure 10C:
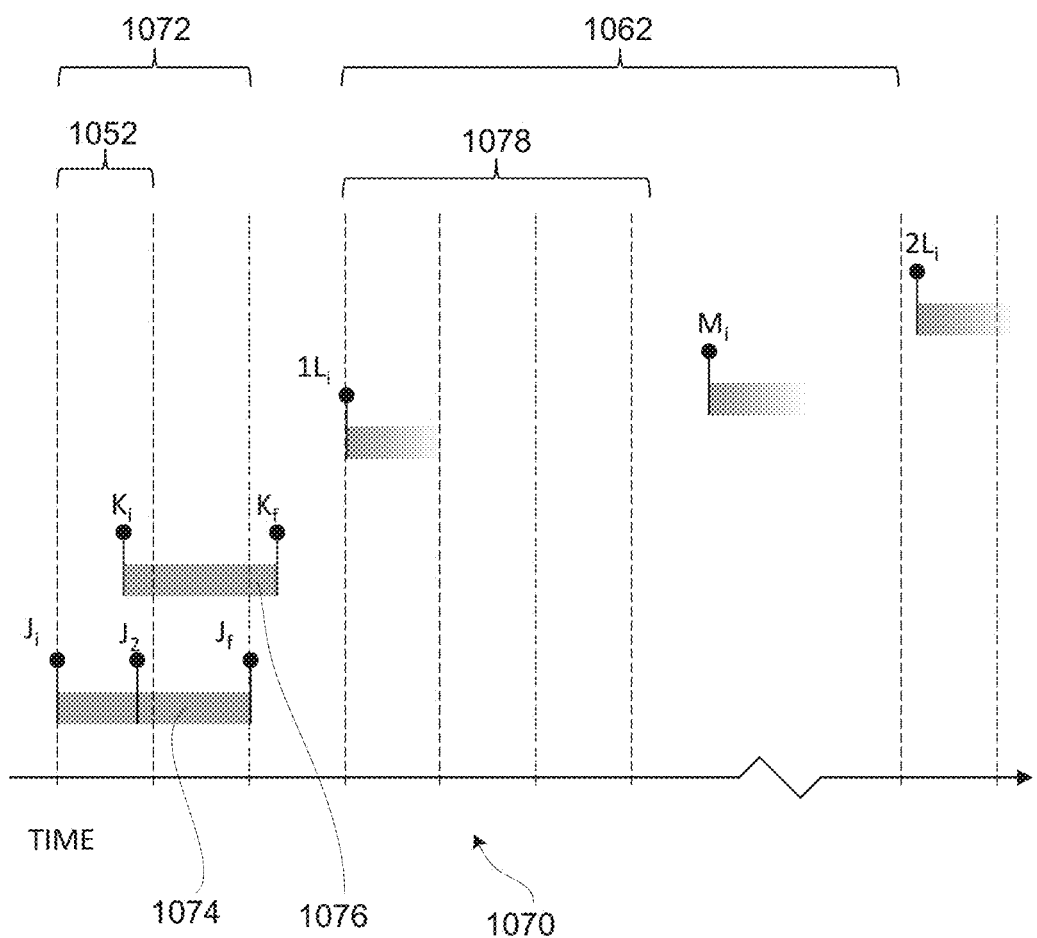

FIG. 10 is a flowchart representative of example machine-readable instructions for implementing processing at block 525 of the example program 500 of FIG. 5. FIGS. 10A, 10B, and 10C illustrate example timelines 1050, 1060, and 1070 of HTTP requests that may be analyzed by the example timestamp analyzer 214 of the example request analyzer 136 of FIG. 2. The example program 500 of FIG. 10 is described with respect to the example timelines 1050, 1060, and 1070 of FIGS. 10A, 1013, and 10C. It should be noted that while the events of the example table 400 may be processed by the program 500, the example events of FIGS. 10A, 10B, and 10C, while similar to the example table 400, do not represent the example table 400. Rather, FIGS. 10A, 10B, and 10C represent alternative timelines.

In the examples of FIGS. 10 and 10A-10C, to analyze proxied requests to determine which of the requests are foreground requests, the example burst identifier 216 of the example timestamp analyzer 214 determines whether at least two consecutive requests are separated by at most a closely-spaced time period 1052 (block 1012). In some examples, these closely-spaced in time consecutive requests may be collectively referred to as a burst 1054. In some embodiments, a closely-spaced time period may be 5 seconds; however, other lengths of time are possible. As shown in FIG. 10A, burst 1054 is made up of an application A's initial, second, and final requests $A_i$, $A_2$, $A_f$, an application B's initial request and an application C's initial request $C_i$. In some examples, an application session may be defined by initial and final requests as in the cases of application sessions for A and C 1056, 1058 and denoted in FIGS. 10A-10C by a solid band between the application's respective initial and final requests. In some examples, an application session may be defined by only an initial request as in the case of application session 1059 and denoted in FIG. 10A-10C by a faded band trailing from the application's respective initial request. It should be appreciated that requests $A_i$, $A_2$, $A_f$, and $C_i$ together form burst 1054 because each of these requests is chronologically separated from the next by no more than the closely-spaced time period 1052, despite belonging to different applications. For example, although requests $A_2$ and $A_f$ are separated by more than the closely-spaced time period 1052, request $C_i$ occurs between requests $A_i$ and $A_2$ no more than the closely-spaced time period 1052 away from requests $A_2$ and $A_f$; thus requests $A_2$, $C_i$; and $A_f$ are consecutively spaced in time apart from each other by no more than the closely-spaced time period 1052 and form part of burst 1054. If, however, the example burst identifier 216 finds that the request is not part of a burst, as illustrated by application C's final request $C_f$, the program may send the request to the example duration calculator 138 (block 1030).

Looking back at block 10 and focusing now on the illustrated example of FIG. 10B, if the example burst identifier 216 locates a burst, such as that composed of, for example, by requests $D_i$, $E_i$, $D_2$, $E_f$, $D_f$, and $G_i$, the program 500 may progress to examine the individual requests of that burst (block 1014). It should be understood that, similar to the nomenclature for requests of applications A, B, and C above, requests $D_i$, $D_2$, $D_f$, $E_i$, $E_f$, and $G_i$ respectively refer to an application D's initial, second, and final requests, an application E's initial and final requests, and an application G's initial request. To examine the individual requests of a burst, the request handler 218 of the timestamp analyzer 214 may first determine whether the request being examined is the last request in the burst (block 1016). For example, if the request handler 218 were examining request $G_i$, the request handler 218 would return a "yes" answer for block 1016 as request $G_i$ is the last request of its burst, as shown in FIG. 10B. If the request under examination is the last request of its burst, the last burst request foreground determiner 220 of the timestamp analyzer 214 applies example rules retrieved from the rule data store 224 to find whether the next request following the request under examination occurs at least after a threshold timeout period 1062 (block 1018). If the last burst request foreground determiner 220 determines that the next request after the examined request does occur after the threshold timeout period, the examined request is tagged by the default presentation tagger 226 to receive the default presentation time (block 1026) and is then sent to the example duration calculator 138 (block 1030). For example, as depicted in FIG. 10B, this is the case for requests $G_i$ and $H_i$ as request $G_i$ is the last request in its burst and request Hi occurs more than the threshold timeout period 1062 after request $G_i$.

Referring back to block 1018 and looking now at FIG. 10C, if the next request after the request under examination happens before the threshold timeout period elapses, the last burst request foreground determiner 220 applies example rules retrieved from the rule data store 224 to find whether two consecutive application sessions each lasting no more than a threshold brief period 1072 precede the examined request (block 1020). For example, application J's session 1074 and application K's session 1076 begin consecutively and each last for less than the threshold brief period 1072. Continuing with the same example, if the last burst request foreground determiner 220 were examining request $1L_i$, an application L's first session's initial request, the last burst request foreground determiner 220 would return a "yes" answer for block 1020. In some embodiments, the threshold brief period 1072 may be longer than the closely spaced period, for example, 10 seconds, although other time lengths are possible. If no such application sessions are found, the last burst request foreground determiner 220 discards the request (block 1028).

Returning to block 1020 and remaining with FIG. 10C, if, however, applications that meet the criteria of block 1020 are found, the last burst request foreground determiner 220 progresses to determine whether the next request belonging to the same application as the examined request occurs after at least the threshold timeout period 1062 (block 1022). Furthering the previous example where request $1L_i$ is under examination, FIG. 10C shows a circumstance where the application L's second session's initial request $2L_i$ occurs at least the threshold timeout period 1062 after $1L_i$. In this example, the last burst request foreground determiner 220 would thus return a "yes" answer for block 1022. If "no", the last burst request foreground determiner 220 discards the examined request (block 1028).

Looking again at block 1022 and FIG. 10C, if the last burst request foreground determiner 220 finds a "yes" answer, the last burst request foreground determiner 220 moves on to find whether the next request belonging to a different application than the examined request occurs after a threshold intermediate period 1078 but before the expiration of the threshold timeout period 1062 (block 1024). Revisiting the same example where request $1L_i$ is under examination, FIG. 10C shows a situation where an application M's initial request $M_i$ occurs at least the threshold intermediate period 1078 after $1L_i$. In this example, the last burst request foreground determiner 220 would return a "yes" answer for block 1024. In some embodiments, the threshold intermediate period 1078 may be longer than the threshold brief period but shorter than the threshold timeout period. For example, the threshold intermediate period 1078 may be 16 seconds; however, other time lengths are possible.

Refocusing on block 1024, if the last burst request foreground determiner 220 finds a "yes" answer, the examined request is tagged by the default presentation tagger 226 (block 1026) and sent to the example duration calculator 138 (block 1030). Under same example of examining request $1L_i$ according to the surrounding circumstances described in FIG. 10C, the default presentation tagger 226 would thus tag request IL at block 1026 and send request $1L_i$ to the example duration calculator 138 at block 1030. It should be appreciated that upon receiving the tagged request $1L_i$, the example duration calculator 138 may credit application L with the default presentation time. If however, the last burst request foreground determiner 220 finds the next request belonging to an application different to that of the examined request occurs during the threshold intermediate period (block 1024), the last burst request foreground determiner 220 discards examined request is (block 1028).

It should therefore be appreciated that the line of automated questioning presented in FIG. 10 by blocks 1012-1030 may be used to credit the last request of a burst with the default presentation time.

Figure 11:
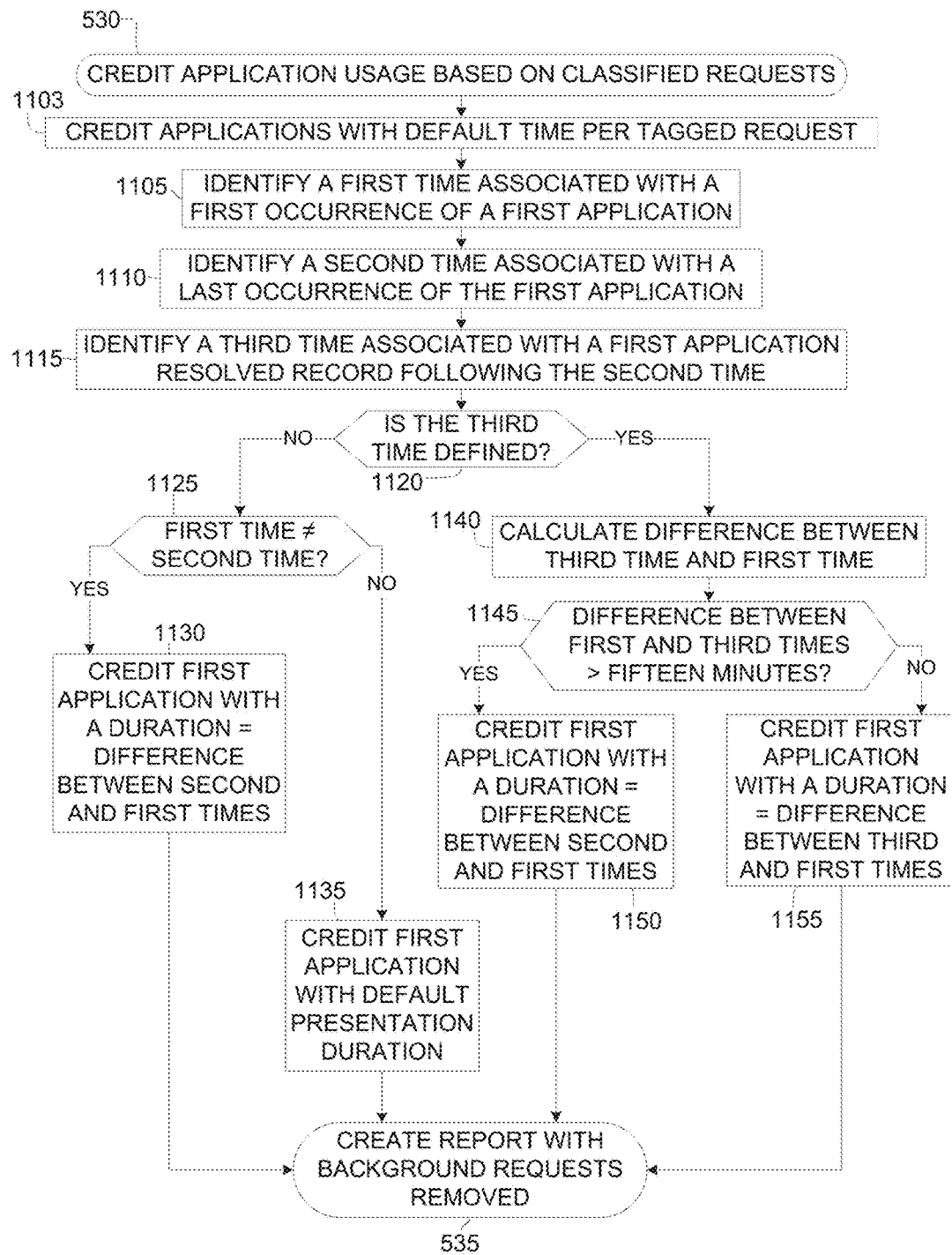
FIG. 11 is a flowchart representative of example machine-readable instructions for implementing the measurement system of FIGS. 1-3.

FIG. 11 is a flowchart representative of example machine-readable instructions for implementing processing at block 530 of the example program 500 of FIG. 5. FIGS. 11A, 11B, 11C, 11D, and 11E illustrate example timelines 1160, 1170, 1180, 1190, 1194 of HTTP requests that may be credited by the example duration calculator 138 of the example creditor 124 of FIG. 1. The example program 500 of FIG. 11 is described with respect to the example timelines 1160, 1170, 1180, 1190, 1194. The example events of FIG. 11A correspond to the example table 400 of FIG. 4. The examples of FIGS. 11B, 11C, 11D, and 11E, while similar to the example table 400, do not represent the example table 400. Rather, FIGS. 11B, 11C, 11D, and 11E represent alternative timelines.

In the example of FIG. 11, to credit applications based on classified requests, the example duration calculator 138 parses the smoothed log (e.g., the smoothed request log 400 of FIG. 4) to crediting applications with the default presentation per tagged request found in the smoothed log (block 1103). For example, upon looking at the smoothed request log 400, the example duration calculator 138 would credit the Facebook application of row 492 with the default presentation time. It should be understood that the example duration calculator 138 may credit an application with multiple units of the default presentation depending on how many tagged rows in the smoothed record log the example duration calculator 138 finds that are respective to that application. Rephrased, the example duration calculator 138 may count how rows are tagged for a given application, may find the product of the number of found tagged rows multiplied by the default presentation time, and may credit the given application with that product.

Next the duration calculator 138 may identify a first time associated with a first occurrence of a first application (block 1105). Example first times are shown in FIGS. 11A, 11B, 11C, and 11D as times 1161, 1171, 1181, and 1191. With respect to the example of FIG. 11A, the first time 1161 is identified by performing a lookup of a timestamp associated with the HTTP request in the example table 400 of FIG. 4 (e.g., the timestamp column 430). In the illustrated example, the example duration calculator 138 identifies the first chronologically application resolved record from a particular application. In examples disclosed herein, the example client device 112 only allows one application to be executed at once. However, some client devices allow more than one application to be executed at a time.

The example duration calculator 138 then identifies a second time associated with a second occurrence of the first application (block 1110). The second time represents the last occurrence of the same identified application of the first time. In the illustrated example, the second time is identified when there are no application resolved (e.g., "app resolved") records from another application having a time of occurrence between the first time and the second time. If, for example, a record from another application were stored in between the first time in the second time, that intermediate request might indicate that the user switched from a first application to a second application, and then back to the first application. With respect to FIGS. 11A, 11B, 11C, and 11D, a second time is shown as times 1162, 1172, 1181, and 1192. In examples disclosed herein, the second application may be a resolved application and/or an unknown application. In some examples, the example duration calculator 138 identifies the second time only when there are no consecutive records between the first time and the second time whose time difference is more than a threshold. For example, in FIG. 11C, the record 1181 at 6:00:00 PM is more than fifteen minutes away from the record 1182 at 6:15:39 PM. Accordingly, the record 1181 is identified as both the first time and the second time. In the illustrated example, the threshold is fifteen minutes, however any other threshold may additionally or alternatively be used. Identifying gaps in the HTTP request log is important because such gaps indicate user inactivity.

The example duration calculator 138 then identifies a third time associated with a first application resolved record following the second time (block 1115). The application associated with the third time is not the same as the application associated with the first time. With continued respect to the example 1180 of FIG. 11C, the record 1182 at 6:15:39 PM represents the same application (e.g., ESPN) as the record 1181 at 6:00:00 PM and, accordingly, the record 1182 is not identified as the third time. That is, the third time represents a time at which the user transitions from a first application to a second application. In some examples, the transition to the second application occurs sometime after a final HTTP request of the first application is transmitted. However, in some examples, the first HTTP request transmitted by the second application occurs upon a launch of the second application. That is, in some examples, the first application was presented until the third time. With respect to the example 1171 of FIG. 11B, the record 1174 at 6:04:43 PM is associated with a different application than the record 1172 (which is identified as the second time), and accordingly, the record 1174 at 6:04:43 is identified as the third time.

Figure 11A:
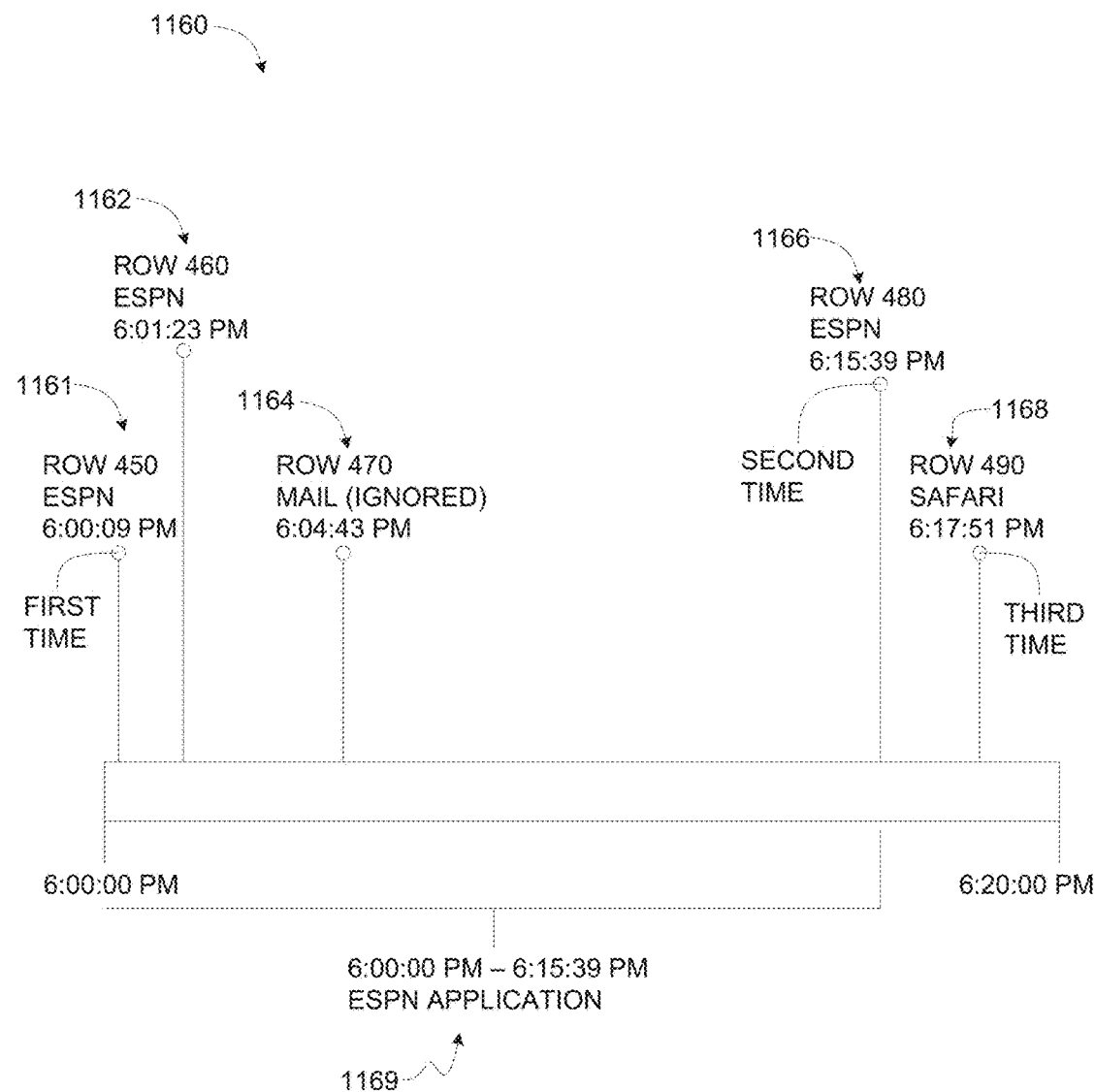
FIGS. 11A, 11B, 11C, 11D, and 11E illustrate example timelines of HTTP requests that may be credited by an example duration calculator of an example creditor of the example measurement system FIG. 1.
Figure 11B:
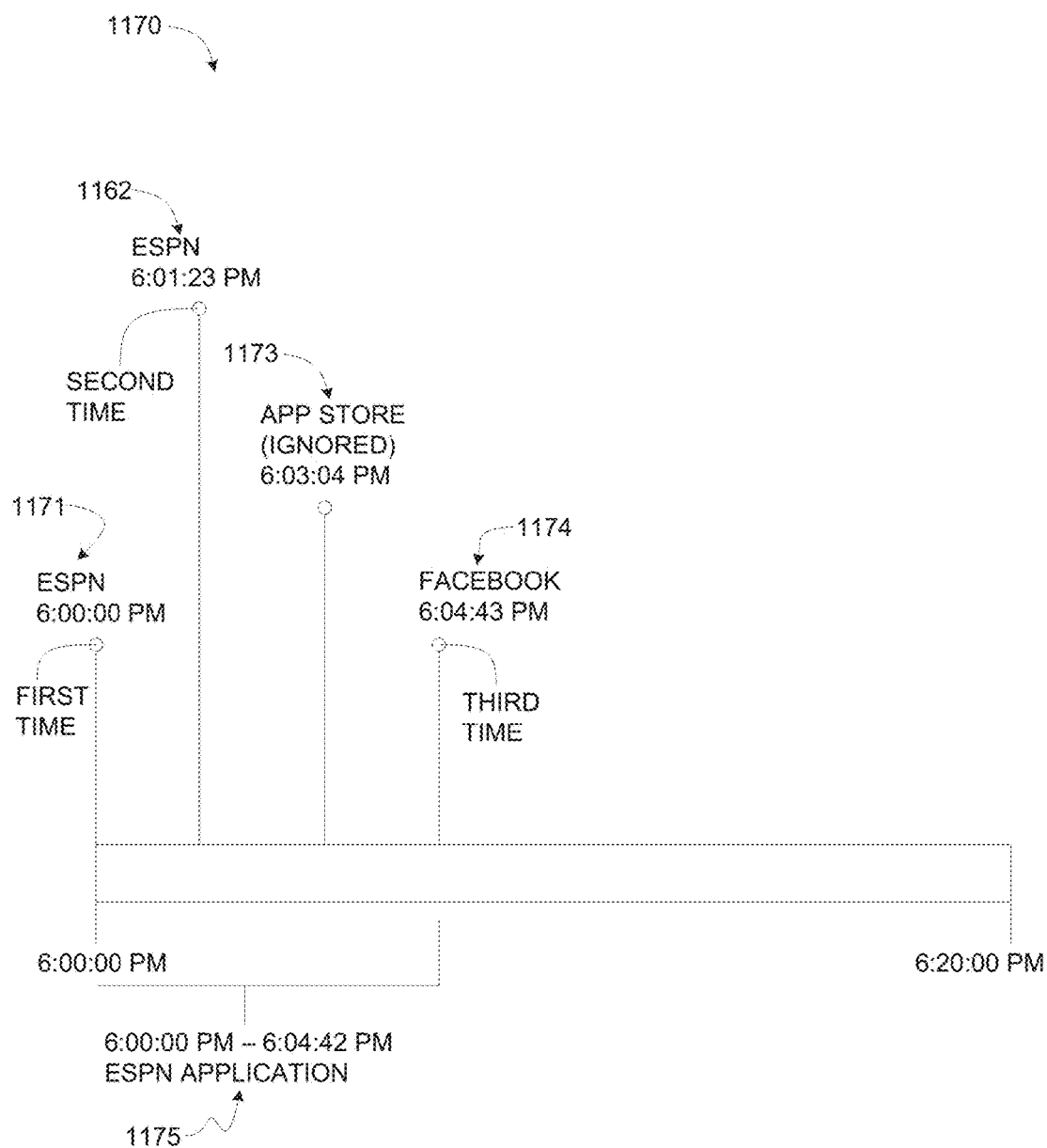
Figure 11C:
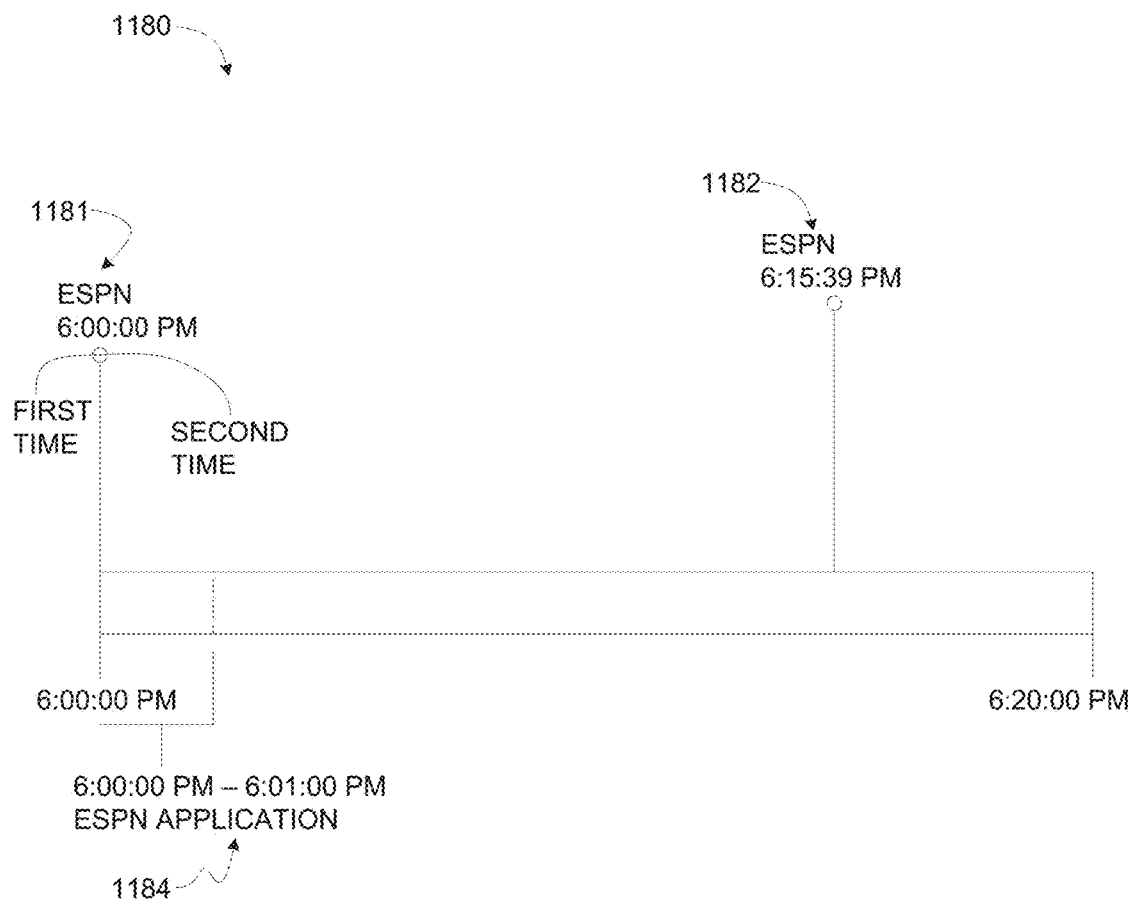
Figure 11D:
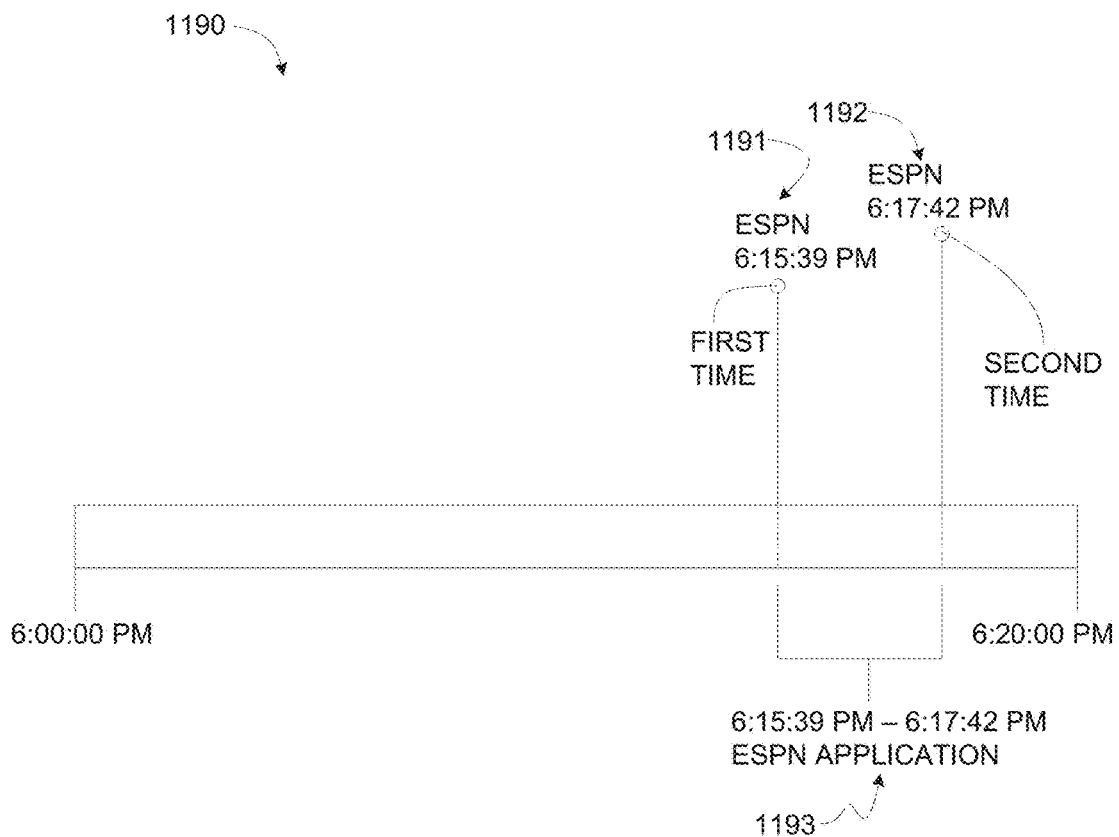

In some examples, the third time may not be defined. That is, no records may exist after the second time. With respect to the examples 1180, 1190 of FIGS. 11C and 11D, no records are identified as the third time. In the illustrated example, the example duration calculator 138 determines whether the third time is defined (block 1120). The illustrated example of FIG. 11D shows an example where a third time is not defined. If the third time is not defined (block 1120), the example duration calculator 138 determines that the first time is different from the second time (block 1125). If the first time is different than the second time (block 1125), the example duration calculator 138 credits and application associated with the first time with a duration of presentation equal to the difference between the second time and the first time (block 1130). In the illustrated example of FIG. 11D, the first time is different from the second time (for both instances of HTTP records 1191, 1192) and a third time is not defined. Accordingly, the record 1191 is credited with a presentation duration 1193 equal to the difference between the first time and the second time.

If the first time is not different from the second time (e.g., the first time and the second time are both associated with a same HTTP request), the example duration calculator 138 credits the first application with the default presentation duration. In the illustrated example of FIG. 11C, the first time is not different from the second time (for both instances of HTTP records 1181, 1182) and a third time is not defined. Accordingly, the record 1181 is credited with the default presentation duration 1184. In the illustrated example of FIG. 11C, the minimal presentation duration is one minute. However, any other default presentation duration may additionally or alternatively be used such as the example fifteen seconds described above, ten seconds, two minutes, etc.

Referring back to block 1120, if the third time is defined, the example duration calculator 138 calculates the difference between the third time and the first time (block 1140). The illustrated examples of FIGS. 11A and 11B show example timelines 1060, 1170 where a third time is defined. The example duration calculator 138 then determines if the difference between the third time and the first time (calculated in block 1140) is greater than a threshold (block 1145). In the illustrated example, the threshold is fifteen minutes. However, any other threshold may additionally or alternatively be used. If the difference between the third time and the first time is greater than the threshold (block 1145), the example duration calculator 138 credits the first application with the duration equal to the difference between the second time and the first time (block 1150). With respect to the illustrated example of FIG. 11A, the difference between the first time (record 1161) and the third time (record 1168) is greater than the threshold. Accordingly, the application associated with the first record 1161 (e.g., the ESPN application) is credited with a duration of presentation 1169 of fifteen minutes and thirty-nine seconds. In the illustrated example, if it takes more than a threshold amount of time from the time that a first HTTP request was received from the first application to the time that a request was received from another application, it is assumed that the user left the first application and is no longer interacting with the first application. To account for this, the last known time (e.g., the second time) that the application was active is used to calculate the presentation duration. If the difference between the third time and the first time is not greater than the threshold (block 1145), the example duration calculator 138 credits the first application with a duration equal to the difference between the third time and the first time (block 1155). With respect to the illustrated example of 11B, the difference between the first time (record 1171) and the third time (record 1174) is not greater than the threshold. Accordingly, the application associated with the first record 1171 is credited with a presentation duration 1175 of four minutes and forty-two seconds.

In examples disclosed herein, the example duration calculator 138 processes each record to determine a presentation duration associated with the application of the record/HTTP request. In the illustrated example, the example duration calculator 138 only processes records that are resolved to a particular application (e.g., "app resolved"). However, in some examples, the example duration calculator 138 determines a presentation duration for unknown applications. In some examples, the unknown application is assigned a minimal unknown presentation duration of one second. The minimal unknown presentation duration ensures that the example reporter 126 is able to identify records that were not application resolved and/or to call out non-generic user agents that have not yet been identified. In some other examples, applications using non-generic user agents (e.g., unidentified applications) are credited as unknown application specific user agents. An identity of these non-generic user agents can be determined at a later time (e.g., manually).

In some examples, application solved records may be associated with an App Store application (e.g., Apple iTunes, Google Play, etc.). In some examples, the App Store application is invoked within another application to, for example, enable a user to purchase another application (e.g., some free applications allow a user to purchase a full version of the application), enable user to purchase application features and/or items (e.g., within a game). In some examples, these App Store application records do not indicate that the user left the application invoking the App Store but, rather indicate that App Store information was requested by the application. In some examples, if records that are application resolved to the App Store application are observed within a threshold time period from records that are application resolved to the App Store application, the App Store application records may be ignored. In the illustrated example of FIG. 11B, the app store record 1173 is ignored as it likely represents in-application offerings made by the ESPN application.

Figure 11E:
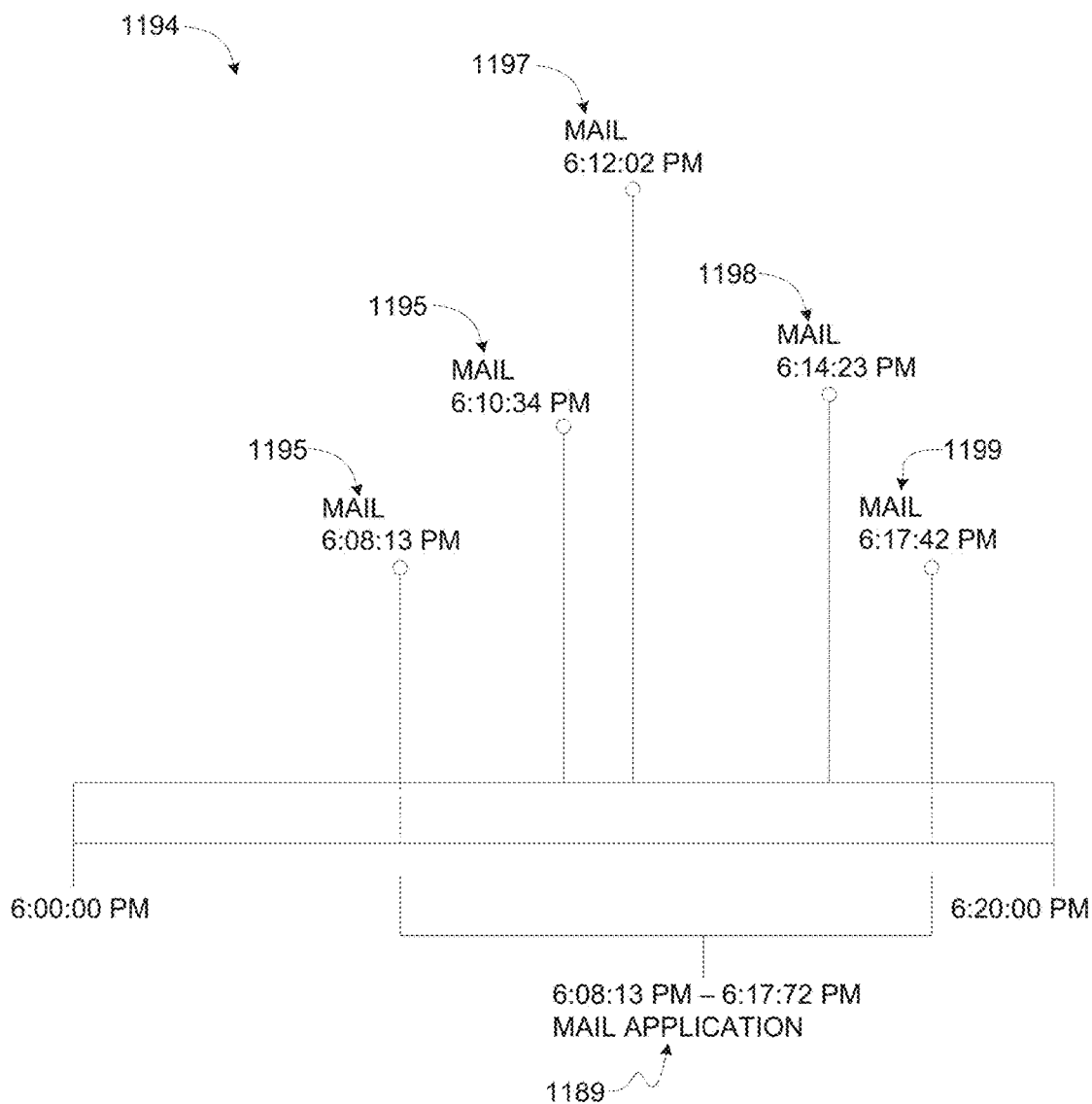

As described above, records that are associated with e-mail applications are filtered out by the example request filter 134. However, in some examples, the request may not be filtered and, instead, may be tagged as being associated with an e-mail application. FIG. 11E illustrates an example timeline 1194 where multiple e-mail application records 1195, 1196, 1197, 1198, 1199 that would otherwise be ignored are credited with a presentation duration 1189. In some examples, monitoring entities are interested to understand how users interact with e-mail applications on a client device. Ignoring and/or filtering records that are associated with the e-mail application may prevent such an analysis. Accordingly, in some examples, the e-mail application records are identified such that the e-mail application may be credited with a presentation duration. However, besides being displayed, the e-mail application may transmit requests in the background of the device and, accordingly, may interfere with application crediting. Accordingly, the example duration calculator 138 of the illustrated example identifies e-mail application records only when a threshold number of records are consecutively included in the request log. In the illustrated example, the threshold number of consecutive records is five. However, any other threshold number may additionally or alternatively be used. The presence of the threshold number of records indicates the user is actively using the e-mail application, and a duration of the e-mail application may be calculated by the example duration calculator 138.

While the examples disclosed herein are described with respect to crediting an application executed by the example client device 112, any other type of crediting may additionally and or alternatively occur. For example, the example duration calculator 138 may credit different URLs (e.g. websites) based on the HTTP records. For example, browser applications such as a browser 322 of the illustrated example FIG. 3 are typically used to request websites from a wide range of domains. While crediting the browser 322 is important, it may also be important to understand which websites the user visited while using a browser 322. Accordingly the example duration calculator 138 may credit different domains (e.g., websites) based on the HTTP records received via the example proxy 120.

Figure 12:
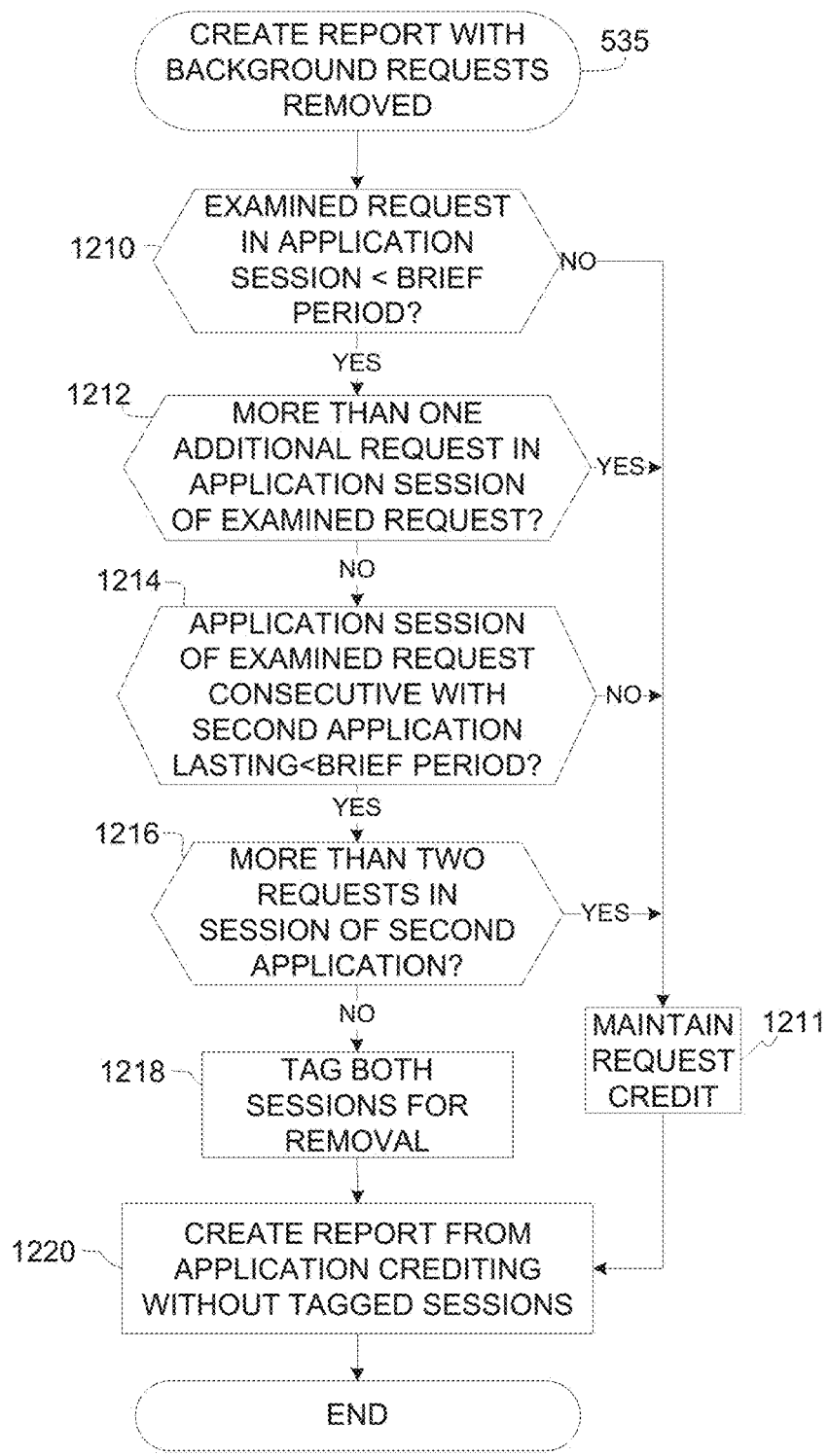
FIG. 12 is a flowchart representative of example machine-readable instructions for implementing the measurement system of FIGS. 1-3.
Figure 12A:
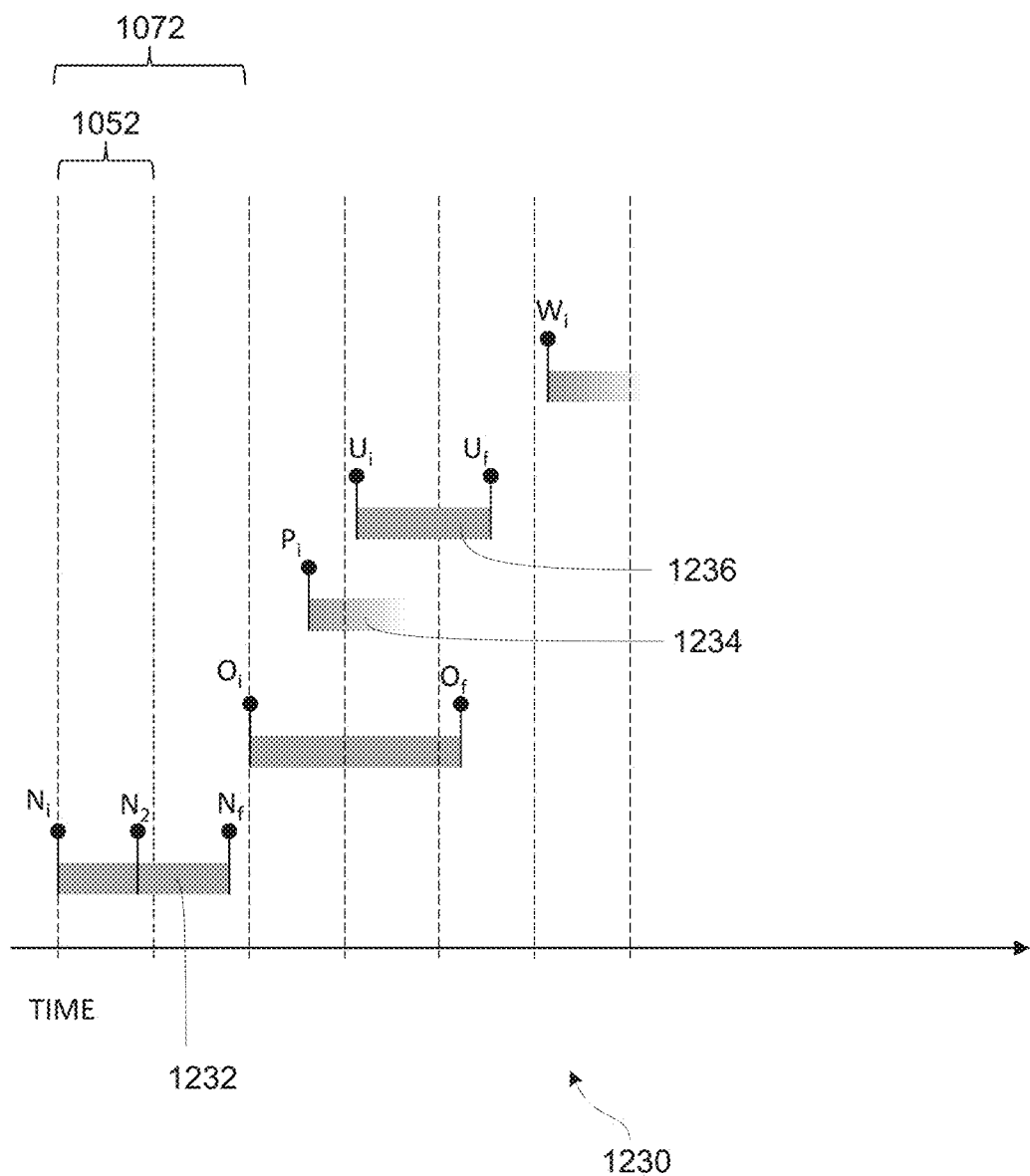
FIG. 12A illustrates an alternative example timeline of HTTP requests that may be credited by the example duration calculator of the example creditor of the example measurement system of FIG. 1.
Figure 12B:
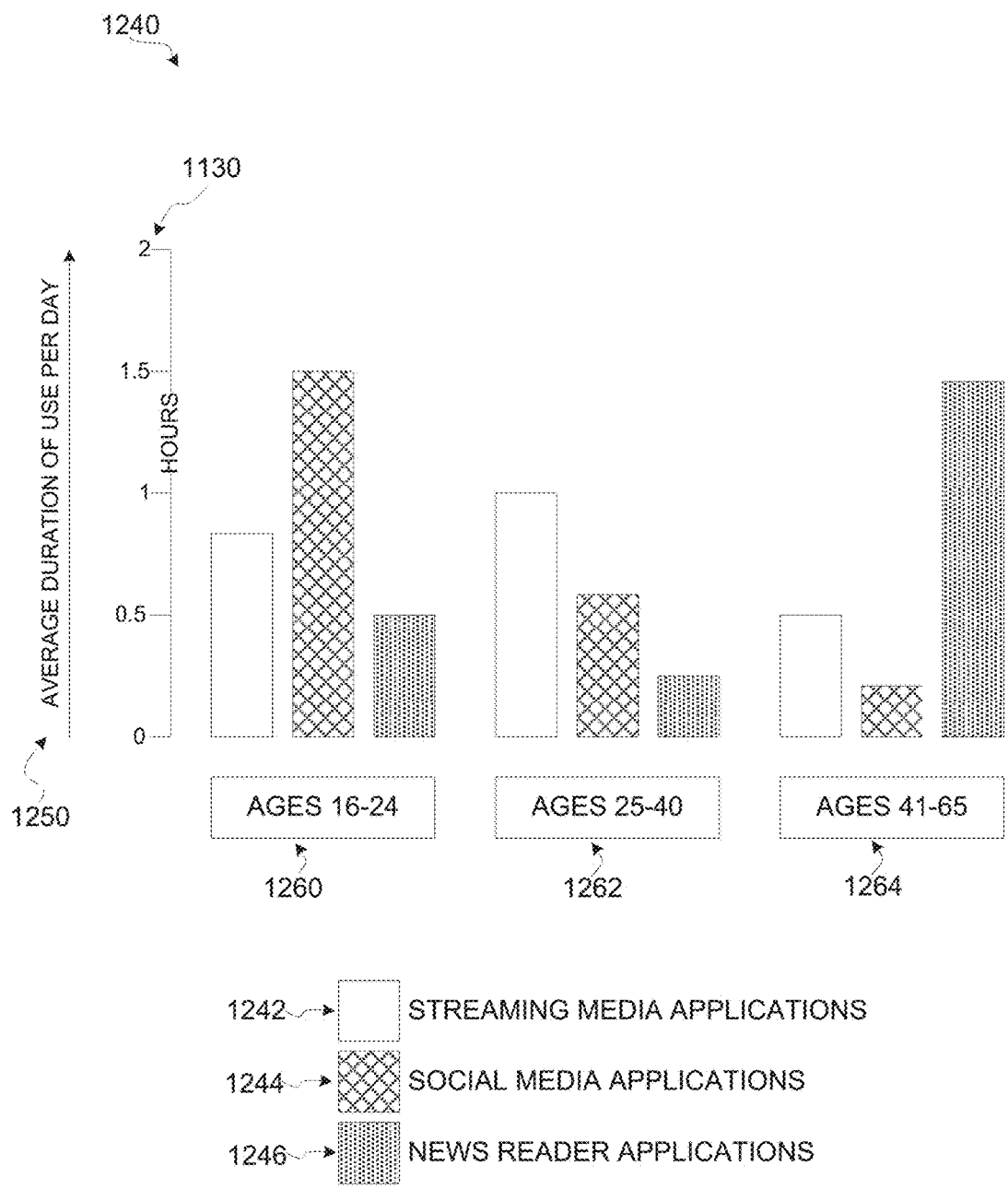
FIG. 12B illustrates an example report that may be created by the example reporter of the example creditor of the example measurement system of FIG. 1.

FIG. 12 is a flowchart representative of example machine-readable instructions for implementing processing at block 535 of the example program 500 of FIG. 5. FIG. 12A illustrates an example timeline 1230 of HTTP requests that may be credited by the example duration calculator 138 of the example creditor 124 of FIG. 1. The example program 500 of FIG. 12 is described with respect to the example timeline 1230. The example of FIG. 12A, while similar to the example table 400, does not represent the example table 400. Rather, FIG. 12A represents an alternative timeline. FIG. 12B illustrates an example report 1240 that may be created by the example reporter 126 of the example creditor 124 of FIG. 1.

In the example of FIG. 12, to create a report with background requests removed, the example the in-burst background determiner 222 of the timestamp analyzer 214 applies example rules retrieved from the rule data store 224 to find whether finds whether the examined request belongs to an application session that is shorter than the threshold brief period 1072 (block 1210). For example, as depicted in FIG. 12A, sessions of applications N, P, and U 1232, 1234, 1236, are shorter than the threshold brief period 1072; thus if any of requests $N_i$, $N_2$, $N_f$, $P_i$, $U_i$, and $U_f$, were under examination, the in-burst background determiner 222 would return a "yes" answer for block 1210. If the in-burst background determiner 222 finds "no" answer for block 1210, the credit of the examined request is maintained (e.g., the elapsed time of the application session of the examined request is not removed from the compiled duration of usage for the application) (block 1211).

However, if the burst background determiner 222 finds a "yes" answer for block 1210, the in-burst background determiner 222 determines whether the application session of the examined request has more than one additional request besides the request under examination, more than two requests in total) (block 1212). This is, for example, the case for application session 1232, which contains three requests, $N_i$, $N_2$, and $N_f$.

Continuing to look at block 1212, if there are more than two requests contained in the application session of the examined request, the credit of the examined request s maintained (block 1211). Thus, revisiting the immediately previous example, if any of requests $N_i$, $N_2$, and $N_f$ were under examination, they would each be ignored due to the processing of block 1212.

If, however, the application session of the examined request has, at most, one more request—as in the cases, for example, of requests $P_i$, $U_i$, and $U_f$ with respect to application sessions 1234, 1236 as shown in FIG. 12A—the in-burst background determiner 222 finds whether a session of a second application that lasts less than the threshold brief period 1072 is consecutive with the application session of the examined request (block 1214). Focusing on the example where $P_i$ is under examination according to the circumstances of described by FIG. 12A, the in-burst background determiner 222 would return a "yes" answer for block 1214 as application session 1236 is shorter than the threshold brief period 1072 and begins consecutively after application session 1234, the application session to which request $P_i$ belongs.

If the in-burst background determiner 222 finds a "no" answer for block 1214, the credit of examined request is maintained (block 1211). If the answer, however, is "yes", the in-burst background determiner 222 determines whether the session of the second application has more than two requests (block 1216). Revisiting the example of an examined request $P_i$ per FIG. 9D, the in-burst background determiner 222 would return a "yes" answer for block 1216 as application session 1236 has two requests, requests $U_i$ and $U_f$.

If the in-burst background determiner 222 finds a "yes" answer for block 1216, the credit of examined request is maintained (block 1211). If the in-burst background determiner 222 finds a "no" answer for block 1216, the request removal tagger 228 of the timestamp analyzer 214 tags both the session of the examined request and the session of the second application as background requests (block 1218). The reporter 126 then creates a report from the application crediting without the tagged sessions (block 1220).

In the illustrated example of FIG. 12B, the example report 1240 illustrates usage statistics 1250 of different types of applications across age demographics of panelists. In the illustrated example, the report 1240 shows usage durations of streaming media applications 1242, social media applications 1244, and news reader applications 1246 for users ages sixteen to twenty-four 1260, ages twenty-five to forty 1262, and ages forty-one to sixty-five 1264. While in the illustrated example, the example report 1240 is based on application type and age, any other factors may additionally or alternatively be used such as, for example, race, geographic location, income, etc. In the illustrated example, the usage statistics 1250 shown in the example report 1240 are average usage durations over a period of one day, measured in hours 1270. That is, durations of individual application sessions are aggregated by the example reporter 126 and reported as a total time of use. However, any other duration and/or statistic may additionally or alternatively be used such as, for example, a number of times an application was opened, an average duration of an individual session of an application, etc.

In some examples, the analysis of blocks 1210-1220 of FIG. 12 may supplement the analysis of blocks 1012-1030 of FIG. 10 to discard background requests that are not the last of a burst. The, the program 535 of FIG. 12 implemented by the in-burst background determiner 222 may work to remove uncreditworthy in-burst background records that slipped through the example request filter 134 by masquerading as creditworthy foreground records and were not analyzed by the last burst request determiner 220. Program 535 prevents falsely positive background records from being incorrectly credited to applications as foreground records at the example duration calculator 138.

Figure 13:
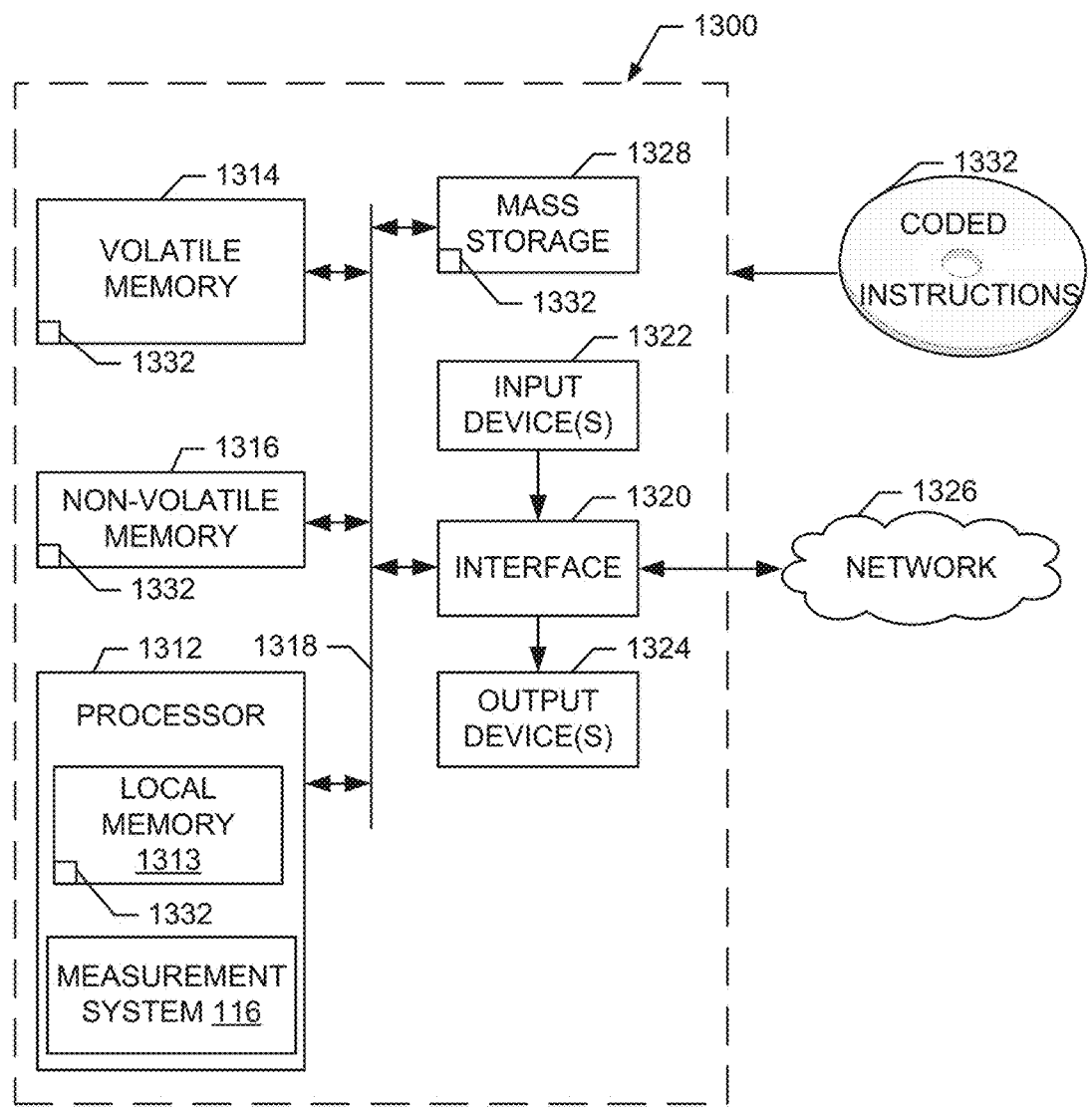
FIG. 13 is a block diagram of an example processor platform capable of executing the instructions of FIGS. 5-12 to implement the example measurement system of FIGS. 1-3.

FIG. 13 is a block diagram of an example processor platform 1300 capable of executing the instructions of FIGS. 5-12 to implement the measurement system 116 of FIGS. 1-3. The processor platform 1300 can be, for example, a server, a personal computer, a mobile device (e.g., a cell phone, a smart phone, a tablet such as an iPad™), a personal digital assistant (PDA), an Internet appliance, a gaming console, a personal video recorder, a set top box, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer.

The processor 1312 of the illustrated example includes a local memory 1313 (e.g., a cache) and the measurement system 116. The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1312. The input device(s) can be implemented by, for example, an audio sensor, a microphone, a camera still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices a light emitting diode (LED), an organic light emitting diode (OLED), a liquid crystal display, a cathode ray tube display (CRT), a touchscreen, a tactile output device, a printer and/or speakers). The interface circuit 1320 of the illustrated example, thus, typically includes a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives.

The coded instructions 1332 of FIGS. 5-12 may be stored in the mass storage device 1328, in the volatile memory 1314, in the non-volatile memory 1316, and/or on a removable tangible computer readable storage medium such as a CD or DVD.

From the foregoing, it will be appreciated that the above disclosed methods, apparatus and articles of manufacture may aid in producing more accurate measurements of application usage by client device users. Additionally, by discarding background requests before crediting, fewer overall requests may be processed, thus improving computer function (e.g., reducing demand on a central processing unit (CPU) and delivering crediting reports more efficiently). Further, based on the more accurate application usage measurements, advertisers may be better able to target advertisements for products that may interest client device users.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method for monitoring mobile Internet usage, the method comprising:
   accessing a log of requests from a proxy, the log of requests being a mixture of foreground requests and background requests, the requests each having a timestamp and each belonging to a respective application;
   identifying the respective applications of the requests from the log of requests;
   identifying a burst of consecutive requests in the log of requests;
   differentiating, by executing an instruction with a processor, between the foreground requests and the background requests in the burst based on the timestamps of the requests; and
   crediting the respective applications of the foreground requests with a presentation duration.

2. The method of claim 1, further comprising establishing a threshold timeout period and wherein the differentiating, by executing the instruction with the processor, between the foreground requests and the background requests of the application in the burst based on the timestamps of the requests includes identifying a last request of the burst and a later request from the log of requests, the later request following the last request of the burst.

3. The method of claim 2, wherein the later request occurs after at least the threshold timeout period.

4. The method of claim 3, wherein the later request consecutively follows the last request of the burst.

5. The method of claim 4, wherein the differentiating, by executing the instruction with the processor, between the foreground requests and the background requests of the application in the burst based on the timestamps of the requests includes tagging the last request of the burst as belonging to the foreground requests.

6. The method of claim 2, further comprising:
   establishing a threshold brief period; and
   establishing an threshold intermediate period,
   wherein the differentiating, by executing the instruction with the processor, between the foreground requests and the background requests of the application in the burst based on the timestamps of the requests further includes
   identifying first and second application sessions in the burst, the first and second application sessions each belonging to different applications with respect to each other and to the respective application of the last request of the burst, and
   identifying an intermediate request from the log of requests, the intermediate request following the last request of the burst and preceding the later request and belonging to a different application than the respective application of the last request of the burst.

7. The method of claim 6, wherein the first and second application sessions precede the last request of the burst, are consecutive, and each last for at most the threshold brief period, the intermediate request occurs after the threshold intermediate period following the last request of the burst elapses and before the threshold timeout period following the last request elapses, the last request of the burst and the later request belong to the same application, and no other request belonging to the application of the last and later requests occurs between the last and later requests.

8. The method of claim 7, wherein the differentiating, by executing the instruction with the processor, between the foreground requests and the background requests of the application in the burst based on the timestamps of the requests includes tagging the last request of the burst as belonging to the foreground requests.

9. The method of claim 1, further comprising establishing a threshold brief period and wherein the differentiating, by executing the instruction with the processor, between the foreground requests and the background requests in the burst based on the timestamps of the requests includes identifying first and second application sessions in the burst.

10. The method of claim 9, wherein the first and second application sessions are consecutive.

11. The method of claim 10, wherein the first and second application sessions are shorter than the threshold brief period.

12. The method of claim 11, wherein the differentiating, by executing the instruction with the processor, between the foreground requests and the background requests in the burst based on the timestamps of the requests includes tagging the first and second application sessions as background requests.

13. An apparatus to monitor mobile Internet usage, the apparatus comprising:
  a proxy server receive requests, the requests having respective timestamps and being a mixture of foreground requests and background requests;
  a request analyzer to differentiate between the foreground requests and the background requests based on the timestamps, the request analyzer including
    an application identifier to associate each request with a respective application,
    a timestamp analyzer to
      identify a burst of the requests based the timestamps,
      identify the foreground requests in the burst based on the timestamps; and
  a duration calculator to credit the respective applications associated with the identified foreground requests with a presentation duration based on the identified foreground requests.

14. The apparatus as in claim 13, wherein the timestamp analyzer includes a request handler to identify a last request of the burst.

15. The apparatus as in claim 14, wherein the timestamp analyzer includes
  a rule data store to store analysis rules;
  a last burst request foreground determiner to determine whether the last request of the burst belongs to the foreground requests based on the analysis rules; and
  a default presentation time tagger to tag the last request of the burst for crediting if the last request of the burst belongs to the foreground requests.

16. The apparatus as in claim 14 wherein the timestamp analyzer is further identify the background requests in the burst based on the timestamps, the duration calculator is further to remove credit from the respective applications associated with the identified background requests, and the request handler is further to identify an in-burst request of the burst.

17. The apparatus as in claim 16, wherein the timestamp analyzer includes
  a rule data store to store analysis rules;
  an in-burst background determiner to determine whether the in-burst request belongs to the background requests based on the analysis rules; and
  a request removal tagger to tag the in-burst request for removal from crediting by the duration calculator if the in-burst request belongs to the background requests.

18. The apparatus as described in claim 13, further comprising a request filter to differentiate between the foreground and background requests based on application information contained in the requests.

19. The apparatus as described in claim 18, wherein the request analyzer finds background requests that pass through the request filter.

20. The apparatus as described in claim 13, further comprising a user identifier to identify a user associated with the requests.

21. The apparatus as described in claim 13, further comprising a device identifier to identify a device associated with the requests.

22. The apparatus as described in claim 13, further comprising a reporter to report the presentation duration credited to the respective application.

23. A tangible machine readable storage medium comprising instructions which, when executed, cause a machine to at least:
  access a log of requests from a proxy, the log of requests being a mixture of foreground requests and background requests, the requests each having a timestamp, the requests each having a respective application;
  identify the respective applications of the requests from the log of requests;
  identify a burst of consecutive requests in the log of requests;
  differentiate, with a processor, between the foreground requests and the background requests in the burst based on the timestamps of the requests; and
  credit the respective applications of the foreground requests with a presentation duration.

24. The machine readable storage medium as described in claim 23, wherein the instructions, when executed, further cause the machine to establish a threshold timeout period and identify a last request of the burst and a later request, the later request following the last request of the burst.

25. The machine readable storage medium as described in claim 24, wherein the later request occurs after at least the time-out period.

26. The machine readable storage medium as described in claim 25, wherein the later request consecutively follows the last request of the burst.

27. The machine readable storage medium as described in claim 26, wherein the instructions, when executed, further cause the machine to tag the last request of the burst as belonging to the foreground requests.

28. The machine readable storage medium as described in claim 24, wherein the instructions, when executed, further cause the machine to at least:
  establish a threshold brief period;
  Establish a threshold intermediate period;
  identify first and second application sessions in the burst, the first and second application sessions each belonging to different applications with respect to each other and to the respective application of the last request of the burst, and
  identify an intermediate request, the intermediate request following the last request of the burst and preceding the later request and belonging to a different application than the respective application of the last request of the burst.

29. The machine readable storage medium as described in claim 28, wherein the first and second application sessions precede the last request of the burst, are consecutive, and each last for at most the threshold brief period,
- the intermediate request occurs after the threshold intermediate period following the last request of the burst elapses and before the threshold timeout period following the last request elapses,
- the last request of the burst and the later request belong to the same application, and no other request belonging to the application of the last and later requests occurs between the last and later requests.

30. The machine readable storage medium as described in claim 29, wherein the instructions, when executed, further cause the machine to tag the last request of the burst as belonging to the foreground requests.

31. The machine readable storage medium as described in claim 23, wherein the instructions, when executed, further cause the machine to establish a threshold brief period and identify first and second application sessions in the burst.

32. The machine readable storage medium as described in claim 31, wherein the first and second application sessions are consecutive.

33. The method of claim 32, wherein the first and second application sessions are shorter than the threshold brief period.

34. The method of claim 33, wherein the instructions, when executed, further cause the machine to tag the first and second application sessions as background requests.

* * * * *

UNITED STATES PATENT AND TRADEMARK OFFICE
CERTIFICATE OF CORRECTION

PATENT NO. : 10,129,349 B2
APPLICATION NO. : 15/253350
DATED : November 13, 2018
INVENTOR(S) : Achilleas Papakostas and Susan Cimino Page 1 of 1

It is certified that error appears in the above-identified patent and that said Letters Patent is hereby corrected as shown below:

In the Claims

Column 36, Line 46 (Claim 6): replace "an threshold" with --a threshold--

Signed and Sealed this
Fourteenth Day of May, 2019

Andrei Iancu
*Director of the United States Patent and Trademark Office*